United States Patent
Sinha et al.

(10) Patent No.: US 10,885,081 B2
(45) Date of Patent: Jan. 5, 2021

(54) SYSTEMS AND METHODS FOR CONTEXTUAL RANKING OF SEARCH RESULTS

(71) Applicant: Optum Technology, Inc., Eden Prairie, MN (US)

(72) Inventors: Anshuman Sinha, Bangalore (IN); Sanjay Kumar Singh, Karnataka (IN); Nilabh Sagar, Karnataka (IN)

(73) Assignee: Optum Technology, Inc., Eden Prairie, MN (US)

( * ) Notice: Subject to any disclaimer, the term of this patent is extended or adjusted under 35 U.S.C. 154(b) by 242 days.

(21) Appl. No.: 16/025,423

(22) Filed: Jul. 2, 2018

(65) Prior Publication Data

US 2020/0004876 A1 Jan. 2, 2020

(51) Int. Cl.
  *G06F 16/33* (2019.01)
  *G06F 16/93* (2019.01)
  *G06F 16/31* (2019.01)
  *G06F 16/338* (2019.01)
  *G06F 16/35* (2019.01)

(52) U.S. Cl.
  CPC ........ *G06F 16/3344* (2019.01); *G06F 16/313* (2019.01); *G06F 16/338* (2019.01); *G06F 16/353* (2019.01); *G06F 16/93* (2019.01)

(58) Field of Classification Search
  CPC .............................. G06F 16/3344; G06F 17/30
  See application file for complete search history.

(56) References Cited

U.S. PATENT DOCUMENTS

| | | |
|---|---|---|
| 6,633,868 B1 | 10/2003 | Min et al. |
| 6,738,764 B2 | 5/2004 | Mao et al. |
| 6,986,104 B2 | 1/2006 | Green et al. |
| 7,003,513 B2 | 2/2006 | Geiselhart |
| 7,398,201 B2 | 7/2008 | Marchisio et al. |
| 7,599,914 B2 | 10/2009 | Patterson |
| 7,822,699 B2 | 10/2010 | Katariya et al. |
| 7,917,503 B2 | 3/2011 | Mowatt et al. |

(Continued)

FOREIGN PATENT DOCUMENTS

| | | |
|---|---|---|
| WO | WO-2016/0090197 A1 | 6/2016 |
| WO | WO-2017/051425 A1 | 3/2017 |

OTHER PUBLICATIONS

Bricon-Souf, N., et al., "Context awareness in health care: A review," International Journal of Medical Informatics, 76:2-12 (2007).

(Continued)

*Primary Examiner* — Giovanna B Colan
(74) *Attorney, Agent, or Firm* — Alston & Bird LLP

(57) ABSTRACT

Systems, apparatuses, methods, and computer program products are disclosed for searching electronic documents. An example method includes receiving a set of electronic documents, wherein each electronic document in the set of electronic documents comprises a set of sentences. The example method further includes generating a contextual index that associates each sentence with one or more of contexts. The example method further includes receiving an electronic search query comprising a plurality of search terms. Subsequently, the example method includes generating a contextual search ranking for a subset of the set of electronic documents based on the search terms and the contextual index.

18 Claims, 21 Drawing Sheets

(56) References Cited

U.S. PATENT DOCUMENTS

| | | | |
|---|---|---|---|
| 8,055,669 | B1 | 11/2011 | Singhal et al. |
| 8,055,675 | B2 | 11/2011 | Higgins et al. |
| 8,060,501 | B1 | 11/2011 | Harik et al. |
| 8,244,723 | B2 | 8/2012 | Dean et al. |
| 8,290,967 | B2 | 10/2012 | Vailaya et al. |
| 8,380,721 | B2 | 2/2013 | Attaran Rezaei et al. |
| 8,412,703 | B2 | 4/2013 | Yu |
| 8,452,769 | B2 | 5/2013 | Altaf et al. |
| 8,676,802 | B2 | 3/2014 | Zelevinsky et al. |
| 8,762,371 | B1 | 6/2014 | Zhang |
| 8,909,637 | B2 | 12/2014 | Patterson et al. |
| 8,965,904 | B2 | 2/2015 | Dinh et al. |
| 9,152,623 | B2 | 10/2015 | Wroczynski et al. |
| 9,378,204 | B2 | 6/2016 | Mueller et al. |
| 9,390,143 | B2 | 7/2016 | McDonnell et al. |
| 9,418,150 | B2 | 8/2016 | Charlot et al. |
| 9,460,193 | B2 | 10/2016 | Ghani et al. |
| 9,792,277 | B2 | 10/2017 | Srinivasan |
| 2003/0018659 | A1 | 1/2003 | Fuks et al. |
| 2005/0060290 | A1 | 3/2005 | Herscovici et al. |
| 2005/0216443 | A1* | 9/2005 | Morton ............... G06F 16/447 |
| 2005/0273839 | A1 | 12/2005 | Mikkonen et al. |
| 2006/0294100 | A1 | 12/2006 | Meyerzon et al. |
| 2007/0192309 | A1* | 8/2007 | Fischer ............... G06F 16/3344 |
| 2008/0172364 | A1 | 7/2008 | Cucerzan et al. |
| 2010/0169297 | A1 | 7/2010 | Haveliwala et al. |
| 2012/0158685 | A1 | 6/2012 | White et al. |
| 2012/0319416 | A1 | 12/2012 | Ellis et al. |
| 2014/0251056 | A1 | 9/2014 | Preuss |
| 2014/0317080 | A1 | 10/2014 | Piraino et al. |
| 2016/0090197 | A1 | 3/2016 | Hickman |
| 2016/0132589 | A1 | 5/2016 | Nolan et al. |
| 2016/0147878 | A1 | 5/2016 | Mana |
| 2016/0179934 | A1* | 6/2016 | Stubley ............... G06F 16/3344 707/722 |
| 2016/0283523 | A1 | 9/2016 | Farenden et al. |
| 2016/0306877 | A1 | 10/2016 | Winther |
| 2017/0262412 | A1 | 9/2017 | Liang et al. |
| 2017/0364587 | A1* | 12/2017 | Krishnamurthy ..... G06F 40/284 |
| 2018/0089525 | A1* | 3/2018 | Yang ..................... G06K 9/344 |
| 2018/0174020 | A1* | 6/2018 | Wu ......................... G06N 3/08 |
| 2019/0294962 | A1* | 9/2019 | Vezer .................... G06N 7/005 |

OTHER PUBLICATIONS

Nita, B., et al., "Towards Context-Aware HER-Based Healthcare Systems," Service Computation 2012: The Fourth International Conferences on Advanced Service Computing, pp. 29-36 (2012).
"Health Online 2013 / Pew Research Center," [Retrieved from the Internet on Sep. 28, 2018: <URL: http://www.pewinternet.org/2013/01/15/health-online-2013/>].
"Your.MD —Health Guide and Symptom Checker," [Retrieved from the Internet on Sep. 28, 2018: <URL: https://www.your.md/>].
"Various Survey Statistics: Workers Spend Too Much Time Searching for Information," [Retrieved from the Internet on Sep. 28, 2018: <URL: http://www.cottrillresearch.com/various-survey-statistics-workers-spend-too-much-time-searching-for-information/>].
Xiao-Ling, W., et al., "A New Method to Query Document Database by Content and Structure," Journal of Software 13(4): (2002).
Medlock, B., et al., "Weakly Supervised Learning for Hedge Classification in Scientific Literature," Proceedings of the 45th Annual Meeting of the Association of Computational Linguistics, pp. 992-999 (Jun. 2007).
Jarvelin, K., et al.., "IR evaluation methods for retrieving highly relevant documents," Proceedings of the 23rd Annual International ACM SIGIR Conference on Research and Development in Information Retrieval, pp. 41-48 (2000).

* cited by examiner

500

| Terms | Sentences | Documents | Term Count | Term Location | Sentence Word Count | Sentence Context |
|---|---|---|---|---|---|---|
| Term1 | 3 | 1 | 1 | 84 | 128 | 1 |
|  | 4 | 2 | 1 | 7 | 256 | 1 |
|  | 5 | 2 | 1 | 215 | 214 | 2 |
|  | 2 | 1 | 1 | 66 | 90 | 1 |
| Term2 | 1 | 1 | 1 | 206 | 218 | 1 |
|  | 4 | 2 | 1 | 212 | 256 | 1 |
|  | 4 | 2 | 1 | 46 | 256 | 1 |
| Term3 | 1 | 1 | 4 | 7,46,186,208 | 218 | 2 |
|  | 2 | 1 | 2 | 7,66 | 90 | 1 |
|  | 3 | 1 | 3 | 46,66,90 | 128 | 1 |

Master data of extracted information (A)

| Term | Name | Sentence | Term Location |
|---|---|---|---|
| 1 | Term1 | 3 | 94 |
| 1 |  | 4 | 7 |
| 1 |  | 5 | 212 |
| 1 |  | 2 | 66 |
| 2 | Term2 | 1 | 200 |
| 2 |  | 4 | 212 |
| 2 |  | 4 | 45 |
| 3 | Term3 | 1 | 7, 45, 185, 208 |
| 3 |  | 2 | 7, 86 |
| 3 |  | 3 | 40, 50, 90 |
| 3 |  | 5 | 66, 84 |

Term-Sentence-Term Location Information (B)

| Context id | Context Name | Edit |
|---|---|---|
| 1 | Context 1 | 0/1 |
| 2 | Context 2 | 0/1 |

Context Information (C)

| Sentence Id | Sentence Name | Sentence Word Count | Edit |
|---|---|---|---|
| 1 | Sentence 1 | 210 | 0/1 |
| 2 | Sentence 2 | 250 | 0/1 |
| 3 | Sentence 3 | 128 | 0/1 |
| 4 | Sentence 4 | 250 | 0/1 |
| 5 | Sentence 5 | 214 | 0/1 |

Sentence Information (D)

| Term Id | Term Dictionary |
|---|---|
| 0 | Term1 |
| 1 | Term2 |
| 2 | Term3 |

Term Information (E)

| Term | Sentence |
|---|---|
| 1 | 2,3,4,5 |
| 2 | 1,4 |
| 3 | 1,2,3,5 |

Term-Sentence (F) — 1110

| Context | Sentence |
|---|---|
| 1 | 1,2,3,4 |
| 2 | 1,5 |

Context-Sentence (G) — 1120

| Document | Sentence |
|---|---|
| 1 | 1,2,3 |
| 2 | 4,5 |

Document-Sentence (H) — 1130

Document 1:
Cluster headaches last from 15 minutes to 3 hours and occur once every other day to up to 8 times daily. It is associated with tearing, runny nose, congestion, sweating and/or droopy eyelid on the same side of the head as the pain. It is characterized by severe, stabbing pain that is around left eye or right eye or the temple. Migraines are painful. Migraine symptoms include a pounding headache, nausea, vomiting, and light sensitivity and are treated with antinausea drugs and abortive or preventive medications. Headaches such as tension headaches and sinus headaches are painful. Headache remedies include pain relievers.

Document 2:
Migraines are painful. Migraine symptoms include nausea, vomiting, and light sensitivity and are treated with antinausea drugs and abortive or preventive medications. It will not result in any pain in the left eye or right eye. Cluster headaches last from 15 minutes to 3 hours and occur once every other day to up to eight times daily. It is associated with tearing, runny nose, congestion, sweating and/or droopy eyelid on the same side of the head as the pain. Headaches such as tension headaches and sinus headaches are painful.

| Term | Name | Sentence | Term Location |
|---|---|---|---|
| 1 | Cluster | 1 | 1 |
| 2 | Headache/s | 1 | 2 |
|  |  | 5 | 6 |
|  |  | 6 | 1,5,8 |
|  |  | 7 | 1 |
| 3 | 15 | 1 | 5 |
| 4 | Minute/s | 1 | 6 |
| 5 | 3 | 1 | 8 |
| 6 | Hour/s | 1 | 9 |
| 7 | Occur/s | 1 | 11 |
| 8 | Every | 1 | 13 |
| 9 | Day/s | 1 | 15 |
| 10 | 8 | 1 | 19 |
| 11 | Time/s | 1 | 20 |
| 12 | Daily | 1 | 21 |
| 13 | Associated | 2 | 3 |
| 14 | Tearing | 2 | 5 |
| 15 | Runny | 2 | 6 |
| 16 | Nose | 2 | 7 |
| 17 | Congestion | 2 | 8 |
| 18 | Sweating | 2 | 9 |
| 19 | Droopy | 2 | 13 |
| 20 | Eyelid | 2 | 14 |
| 21 | Side | 2 | 18 |
| 22 | Head | 2 | 21 |
| 23 | Pain/ful | 2 | 24 |
|  |  | 3 | 10 |
|  |  | 4 | 3 |
|  |  | 9 | 7 |
| 24 | characterized | 3 | 3 |
| 25 | Severe | 3 | 6 |
| 26 | Stabbing | 3 | 8 |
| 27 | Left | 3 | 13 |
|  |  | 9 | 10 |

| Term | Name | Sentence | Term Location |
|---|---|---|---|
| 28 | Eye | 3 | 14,16 |
|  |  | 9 | 11,14 |
| 29 | Right | 3 | 15 |
|  |  | 9 | 14 |
| 30 | Temple | 3 | 20 |
| 31 | Migraine/s | 4 | 1 |
|  |  | 5 | 1 |
| 32 | Painful | 4 | 3 |
|  |  | 6 | 10 |
|  |  | 7 | 4 |
| 33 | symptom/s | 5 | 2 |
| 34 | Pounding | 5 | 5 |
| 35 | Nausea | 5 | 8 |
| 36 | Vomiting | 5 | 10 |
| 37 | Light | 5 | 13 |
| 38 | Sensitivity | 5 | 14 |
| 39 | Treated | 5 | 17 |
| 40 | antinausea | 5 | 19 |
| 41 | Drugs | 5 | 20 |
| 42 | Abortive | 5 | 22 |
| 43 | Preventive | 5 | 24 |
| 44 | Medication | 5 | 25 |
| 45 | Tension | 6 | 4 |
| 46 | Sinus | 6 | 7 |
| 47 | Remedy/ies | 7 | 2 |
| 48 | Reliever/s | 7 | 5 |

Component B

| Context Id | Context Name | Edit |
|---|---|---|
| 1 | Cluster Headache | 0/1 |
| 2 | Migraine | 0/1 |
| 3 | Others | 0/1 |

Component C

| Sentence Id | Sentence Name | Sentence Word Count | Edit |
|---|---|---|---|
| 1 | Cluster headaches last from 15 minutes to 3 hours and occur once every other day to up to 8 times daily. | 22 | 0/1 |
| 2 | It is associated with tearing, runny nose, congestion, sweating and/or droopy eyelid on the same side of the head as the pain. | 27 | 0/1 |
| 3 | It is characterized by severe, stabbing pain that is around left eye or right eye or the temple. | 128 | 0/1 |
| 4 | Migraines are painful. | 4 | 0/1 |
| 5 | Migraine symptoms include a pounding headache, nausea, vomiting, and light sensitivity and are treated with antinausea drugs and abortive or preventive medications. | 27 | 0/1 |
| 6 | Headaches such as tension headaches and sinus headaches are painful. | 10 | 0/1 |
| 7 | Headache remedies include pain relievers. | 6 | 0/1 |
| 8 | Migraine symptoms include nausea, vomiting, and light sensitivity and are treated with antinausea drugs and abortive or preventive medications. | 21 | 0/1 |
| 9 | It will not result in any pain in the left eye or right eye. | 14 | 0/1 |

Component D

| Term | Sentence | Term | Sentence | Term | Sentence |
|------|----------|------|----------|------|----------|
| 1 | 1 | 21 | 2 | 41 | 5 |
| 2 | 1,5,6,7 | 22 | 2 | 42 | 5 |
| 3 | 1 | 23 | 2,3,4,9 | 43 | 5 |
| 4 | 1 | 24 | 3 | 44 | 5 |
| 5 | 1 | 25 | 3 | 45 | 6 |
| 6 | 1 | 26 | 3 | 46 | 6 |
| 7 | 1 | 27 | 3 | 47 | 7 |
| 8 | 1 | 28 | 3,9 | 48 | 7 |
| 9 | 1 | 29 | 3,9 | | |
| 10 | 1 | 30 | 3 | | |
| 11 | 1 | 31 | 4,5 | | |
| 12 | 1 | 32 | 4,6,7 | | |
| 13 | 2 | 33 | 5 | | |
| 14 | 2 | 34 | 5 | | |
| 15 | 2 | 35 | 5 | | |
| 16 | 2 | 36 | 5 | | |
| 17 | 2 | 37 | 5 | | |
| 18 | 2 | 38 | 5 | | |
| 19 | 2 | 39 | 5 | | |
| 20 | 2 | 40 | 5 | | |

Component F

| Context | Sentence |
|---------|----------|
| 1 | 1,2,3 |
| 2 | 4,5,8,9 |
| 3 | 6,7 |

Component G

| Document | Sentence |
|---|---|
| 1 | 1,2,3,4,5,6,7 |
| 2 | 1,2,4,6,8,9 |

Component H

1402
RECEIVING, BY PREPROCESSING CIRCUITRY, A SET OF ELECTRONIC DOCUMENTS, WHEREIN EACH ELECTRONIC DOCUMENT IN THE SET OF ELECTRONIC DOCUMENTS COMPRISES A SET OF SENTENCES

1404
IDENTIFYING, BY THE PREPROCESSING CIRCUITRY, A SET OF TERMS FOR EACH SENTENCE, WHEREIN EACH TERM IN THE SET OF TERMS IS ASSOCIATED WITH ONE OR MORE CONTEXTS IN A SET OF CONTEXTS

1406
GENERATING, BY THE PREPROCESSING CIRCUITRY BASED ON THE SET OF TERMS, A CONTEXT SCORE FOR EACH SENTENCE WITH RESPECT TO EACH CONTEXT IN THE SET OF CONTEXTS

1408
GENERATING, BY THE PREPROCESSING CIRCUITRY, A CONTEXTUAL INDEX THAT ASSOCIATES EACH SENTENCE WITH ONE OR MORE OF THE CONTEXTS BASED ON THE CONTEXT SCORE

1410
RECEIVING, BY QUERY PROCESSING CIRCUITRY, AN ELECTRONIC SEARCH QUERY PROVIDED BY A USER, WHEREIN THE ELECTRONIC SEARCH QUERY COMPRISES A PLURALITY OF SEARCH TERMS

1412
GENERATING, BY THE QUERY PROCESSING CIRCUITRY, A CONTEXTUAL SEARCH RANKING FOR A SUBSET OF THE ELECTRONIC DOCUMENTS BASED ON THE SEARCH TERMS AND THE CONTEXTUAL INDEX

SYSTEMS AND METHODS FOR CONTEXTUAL RANKING OF SEARCH RESULTS

TECHNICAL FIELD

Example embodiments of the present disclosure relate generally to generating search results and, more particularly, to systems and methods for generating contextual search rankings.

BACKGROUND

Traditional search query-based document retrieval systems, such as syntactic search systems and semantic search systems, seek to find documents relevant to search queries input by users by preprocessing and searching voluminous data from different sources. However, current search techniques are often unable to discriminate between documents that are actually relevant to the user's search query and other documents that simply happen to contain the search query terms. For example, traditional syntactic search systems use edit distance to measure the relevancy of documents without consideration of the intention of the search. Accordingly, syntactic search systems will rank documents having less edit distance above documents having greater edit distance, regardless of the respective contexts of those documents and the search query, based on an assumption that all other ranking factors for these documents are identical.

Illustratively, a traditional syntactic search system receives the search string "Stomach upset Goa" from a user seeking to find documents relevant to the medical condition "upset stomach" in the geographic region of Goa, India. The syntactic search system searches a document index that includes two documents. The first document contains the text: "This summer I went to Goa and visited two beaches there. At night I had a huge stomach upset. Next day I went to Mumbai." Accordingly, the first document has a primary context of "Goa visit" and a secondary context of "Mumbai visit," where the phrase "stomach upset" is associated with the primary context "Goa visit." Regardless of these contexts, the syntactic search system calculates, for the first document, a token distance between "stomach upset" and "Goa" of eleven. The second document contains the text: "This summer I went to Mumbai and visited two beaches there. I was enjoying there ... [three more sentences about the trip]. At night I had a huge stomach upset. Next day I went to Goa." Accordingly, the second document has a primary context of "Mumbai visit" and a secondary context of "Goa visit," where the phrase "stomach upset" is associated with the primary context "Mumbai Visit." Regardless of these contexts, the syntactic search system calculates, for the second document, a token distance between "stomach upset" and "Goa" of five. Based on the calculated token distances, the syntactic search system will rank the second document above the first document because the second document's token distance (e.g., five) is less than the first document's token distance (e.g., eleven). However, the user who provided the search string would expect the first document to rank above the second document because the search query is "stomach upset Goa" and the first document contains the phrase "stomach upset" in association with the context "Goa visit," whereas the second document contains the phrase "stomach upset" in association with the context "Mumbai visit."

Alternatively, traditional semantic search systems seek to improve search accuracy over syntactic search systems by understanding the searcher's intent and the contextual meaning of terms as they appear in the searchable dataspace. These semantic search systems require deep domain understanding and highly complex semantic extraction system to extract complete semantics out of a searched document and link the extracted semantics with the linked data (e.g., Reference) concept. However, semantic search systems generally must handle significantly large volumes of documents that require massive preprocessing steps which, in many cases, are not practical or even workable. Thus, these search systems are incapable of providing the most relevant documents searched for by users.

BRIEF SUMMARY

Systems, apparatuses, methods, and computer program products are disclosed herein for contextually indexing electronic documents and generating, in response to an electronic search query provided by a user, contextual search rankings that comprise the most relevant electronic documents searched for by the user. The contextual search ranking system provided herein solves the above problems by providing contextual indices and contextual search rankings for electronic documents based on context hierarchies.

In one example embodiment, a computing system is provided for searching electronic documents. The computing system may comprise preprocessing circuitry. The preprocessing circuitry may be configured to receive a set of electronic documents. Each electronic document in the set of electronic documents may comprise a set of sentences. The preprocessing circuitry may be further configured to identify a set of terms for each sentence. Each term in the set of terms may be associated with one or more contexts in a set of contexts. The preprocessing circuitry may be further configured to generate, based on the set of terms, a context score for each sentence with respect to each context in the set of contexts. The preprocessing circuitry may be further configured to generate a contextual index that associates each sentence with one or more of the contexts in the set of contexts based on the context score. The computing system may further comprise query processing circuitry in communication with the preprocessing circuitry. The query processing circuitry may be configured to receive an electronic search query provided by a user. The electronic search query may comprise a plurality of search terms. The query processing circuitry may be further configured to generate a contextual search ranking for a subset of the set of electronic documents based on the search terms and the contextual index.

In another example embodiment, a computing apparatus is provided for searching electronic documents. The computing apparatus may comprise preprocessing circuitry. The preprocessing circuitry may be configured to receive a set of electronic documents. Each electronic document in the set of electronic documents may comprise a set of sentences. The preprocessing circuitry may be further configured to identify a set of terms for each sentence. Each term in the set of terms may be associated with one or more contexts in a set of contexts. The preprocessing circuitry may be further configured to generate, based on the set of terms, a context score for each sentence with respect to each context in the set of contexts. The preprocessing circuitry may be further configured to generate a contextual index that associates each sentence with one or more of the contexts in the set of contexts based on the context score. The computing apparatus may further comprise query processing circuitry in communication with the preprocessing circuitry. The query processing circuitry may be configured to receive an electronic search query provided by a user. The electronic search query may comprise a plurality of search terms. The query processing circuitry may be further configured to generate a contextual search ranking for a subset of the set of electronic documents based on the search terms and the contextual index.

In yet another example embodiment, a computing method is provided for searching electronic documents. The computing method may comprise receiving, by preprocessing circuitry, a set of electronic documents. Each electronic document in the set of electronic documents may comprise a set of sentences. The computing method may further comprise identifying, by the preprocessing circuitry, a set of terms for each sentence. Each term in the set of terms may be associated with one or more contexts in a set of contexts. The computing method may further comprise generating, by the preprocessing circuitry based on the set of terms, a context score for each sentence with respect to each context in the set of contexts. The computing method may further comprise associating, by the preprocessing circuitry, each sentence with one or more of the contexts in the set of contexts based on the context score. The computing method may further comprise receiving, by query processing circuitry, an electronic search query provided by a user. The electronic search query may comprise a plurality of search terms. The computing method may further comprise generating, by the query processing circuitry, a contextual search ranking for a subset of the set of electronic documents based on the search terms and the contextual index.

In yet another example embodiment, a computer program product is provided for processing electronic information indicative of natural language. The computer program product may comprise at least one non-transitory computer-readable storage medium storing program instructions that, when executed, cause a computing system to receive a set of electronic documents. Each electronic document in the set of electronic documents may comprise a set of sentences. The program instructions, when executed, may further cause the computing system to identify a set of terms for each sentence. Each term in the set of terms may be associated with one or more contexts in a set of contexts. The program instructions, when executed, may further cause the computing system to generate, based on the set of terms, a context score for each sentence with respect to each context in the set of contexts. The program instructions, when executed, may further cause the computing system to generate a contextual index that associates each sentence with one or more of the contexts in the set of contexts based on the context score. The program instructions, when executed, may further cause the computing system to receive an electronic search query provided by a user. The electronic search query may comprise a plurality of search terms. The program instructions, when executed, may further cause the computing system to generate a contextual search ranking for a subset of the set of electronic documents based on the search terms and the contextual index.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

FIG. 5 illustrates example extracted information that may be involved in some example embodiments described herein;

FIG. 6 illustrates example term-sentence-term location information that may be involved in some example embodiments described herein;

FIG. 8 illustrates example context information that may be involved in some example embodiments described herein;

FIG. 9 illustrates example sentence information that may be involved in some example embodiments described herein;

FIG. 10 illustrates example term information that may be involved in some example embodiments described herein;

FIG. 11 illustrates example term-sentence information, context-sentence information, and document-sentence information that may be involved in some example embodiments described herein;

FIG. 12A illustrates an example set of sentences from an example set of electronic documents that may be involved in some example embodiments described herein;

FIG. 12B illustrates example term-sentence-term location information that may be involved in some example embodiments described herein;

FIG. 12C illustrates example context information that may be involved in some example embodiments described herein;

FIG. 12D illustrates example sentence information that may be involved in some example embodiments described herein;

FIG. 12E illustrates example term-sentence information that may be involved in some example embodiments described herein;

FIG. 12F illustrates example context-sentence information that may be involved in some example embodiments described herein;

FIG. 12G illustrates example document-sentence information that may be involved in some example embodiments described herein;

FIG. 14 illustrates an example flowchart for providing a contextual search ranking in accordance with some example embodiments described herein.

DETAILED DESCRIPTION

Figure 1:
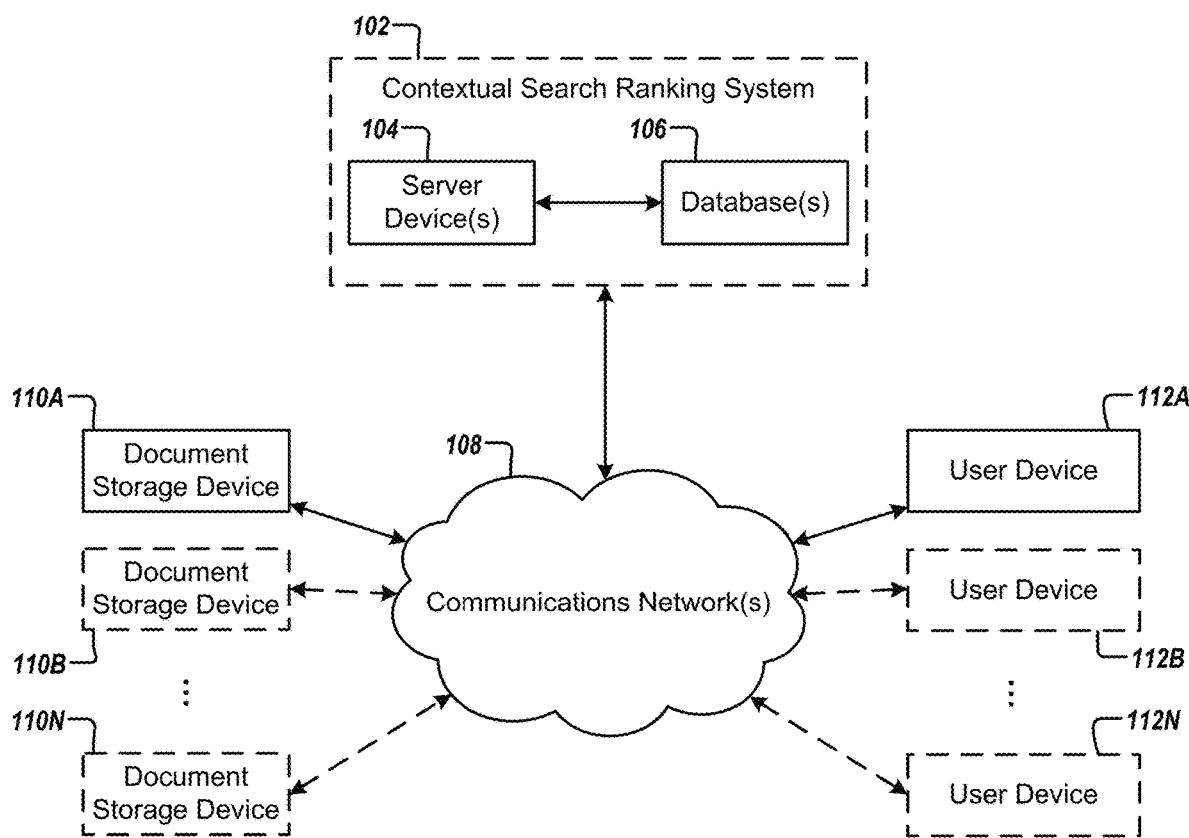
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for generating contextual search rankings for electronic documents based on context hierarchies. Conventional search engines for unstructured text documents may be divided into two groups: keyword-based, in which documents are ranked on the incidence (e.g., the existence and frequency) of keywords provided by the user; and categorization-based, in which information within the documents to be searched, as well as the documents themselves, are pre-classified into "topics" that are used to augment the retrieval process. The basic keyword search is well-suited for queries in which the topic can be described by a unique set of search terms. This basic technique selects documents based on exact matches to these terms and then refines searches using Boolean operators (e.g., and, not, or) that allow users to specify which words and phrases must and must not appear in the returned documents. However, many users consider the construction of Boolean search queries to be laborious and too difficult to use effectively. Moreover, unless the user can find a combination of words appearing only in the desired documents, the results will generally contain too many unrelated documents to be of use.

Over time several improvements have been made to the basic keyword search, such as query expansion techniques and categorization techniques. Query expansion is a general technique in which keywords are used in conjunction with a thesaurus to find a larger set of terms with which to perform the search. Query expansion can improve recall (e.g., results in fewer missed documents) but usually at the expense of precision (e.g., results in more unrelated documents) due to the increased number of documents returned. Natural language parsing falls into the larger category of keyword preprocessing in which the search terms are first analyzed to determine how the search should proceed. For example, the query "West Bank" comprises an adjective modifying a noun. Instead of treating all documents that include either "west" or "bank" with equal weight, keyword preprocessing techniques can instruct the search engine to rank documents that contain the phrase "west bank" more highly. One traditional search system makes extensive use of query expansion and keyword preprocessing methods, recognizing around 105 commonly used phrases. However, even with these improvements, keyword searches may fail in many cases where word matches do not signify the overall relevance of the document. For example, a document about an experimental theater space is unrelated to the search query "experiments in space" but may contain all of the search query terms.

Categorization techniques attempt to improve the relevance of search results by inferring "topics" from the search terms and retrieving documents that have been pre-determined to contain those topics. The general technique begins by analyzing the document collection for recognizable patterns using standard methods such as statistical analysis and neural network classification. As with all such analyses, word frequency and proximity are the parameters being examined, compiled, or both. Documents are then "tagged" with these patterns (often called "topics" or "concepts") and retrieved when a match with the search terms or their associated topics have been determined. In practice, this approach performs well when retrieving documents about prominent (e.g., statistically significant) subjects. Given the sheer number of possible patterns, however, only the strongest correlations can be discerned by a categorization method. Thus, for searches involving subjects that have not been predefined, the subsequent search typically relies solely upon the basic keyword matching method is susceptible to the same shortcomings.

In some embodiments, the present disclosure relates to a contextual search ranking system for searching electronic documents that requires only lightweight preprocessing and storage and provides for a better search ranking methodology. In some embodiments, the contextual search ranking system may comprise preprocessing circuitry and query processing circuitry in communication with the preprocessing circuitry. The preprocessing circuitry may be configured to receive a set of electronic documents. Each electronic document in the set of electronic documents may comprise a set of sentences. The preprocessing circuitry may be further configured to identify a set of terms for each sentence. Each term in the set of terms may be associated with one or more contexts in a set of contexts. The preprocessing circuitry may be further configured to generate, based on the set of terms, a context score for each sentence with respect to each context in the set of contexts. The preprocessing circuitry may be further configured to generate a contextual index that associates each sentence with one or more of the contexts in the set of contexts based on the context score. The query processing circuitry may be configured to receive an electronic search query provided by a user. The electronic search query may comprise a plurality of search terms. The query processing circuitry may be further configured to generate a contextual search ranking for a subset of the set of electronic documents based on the search terms and the contextual index.

In some embodiments, the present disclosure relates to a contextual search ranking system for contextualizing healthcare data to improve search results responsive to user initiated searches for healthcare content. In some embodiments, the contextual search ranking system provides faster, more structured, and more meaningful search results to users at less cost using improved preprocessing and query processing phases. In some embodiments, in the preprocessing phase, the contextual search ranking system may contextually index documents for use during the query processing phase. During the preprocessing phase, the contextual search ranking system may use a two-step sub-process that may assign a context to each sentence in each document. First, the contextual search ranking system may use natural language processing (NLP) to identify different sentences and resolve co-reference of expressions that refer to the same entity. Second, the contextual search ranking system may use a supervised text classification machine learning method to assign each identified sentence to a context from a predetermined set of contexts based on a comparison of that sentence's similarity to sentences in "learning sets" of test sentences generated by an analyst for each context. The contextual search ranking system may score each identified sentence in relation to every context, and classify each identified sentence into a context if that sentence's score is above a predetermined threshold value. In some embodiments, in the query processing phase, the contextual search ranking system may receive an electronic search query from a user and generate an ordered list of documents based on relevancy rankings of the documents indexed during preprocessing phase. During the query processing phase, the contextual search ranking system may identify terms in the received electronic search query and calculate term frequency, inverse document frequency, contextual field level normalization, keyword strength, context strength, and edit distance. Next, the contextual search ranking system may calculate, for each document, relevancy rankings for various contexts based on the previously calculated term frequency, inverse document frequency, contextual field level normalization, keyword strength, and context strength. The contextual search ranking system then may calculate a cumulative ranking score for each document based on the relevancy rankings. Finally, the contextual search ranking system may order the cumulative ranking scores to generate a contextual search ranking, such as an ordered list of documents for presentation to the user.

In some embodiments, the present disclosure relates to a contextual search ranking system for receiving a plurality of documents for storing in a document storage system and performing preprocessing of each of the documents. In some embodiments, the preprocessing may comprise identifying key attributes of each sentence in each document, where the key attributes are associated with a set of predetermined contexts. In some embodiments, the preprocessing may further comprise scoring each of the sentences with respect to each of the contexts in the predetermined set of contexts. In some embodiments, the preprocessing may further comprise associating each sentences with one or more of the contexts in the set of contexts based on the scoring. In some embodiments, the contextual search ranking system may receive a query comprising a plurality of search terms and perform query processing of the query to generate a list of documents stored in the document storage system based on the search terms and the contexts associated with the sentences in the plurality of documents; and communicating the list to a user.

There are many advantages of these and other embodiments described herein, such as: providing meaningful search results to users in less time, a more structured format, and reduced cost; decreasing preprocessing and storage requirements; and providing a better search ranking methodology Definitions As used herein, the terms "data," "data structure," "electronic document," "content," "information," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like. As used herein, the term "document" refers to an electronic document.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "utility," and other such terms should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, or utilities.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more document storage devices, user devices, or a combination thereof. Example embodiments of the user devices include any of a variety of stationary or mobile computing devices, such as a portable digital assistant (PDA), mobile telephone, smartphone, smartwatch, smart speaker, tablet computer, laptop computer, desktop computer, kiosk computer, electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to contextually index sets of electronic documents and generate contextual search rankings in response to electronic search queries provided by users. As illustrated, a contextual search ranking system 102 may be connected to one or more server devices 104 in communication with one or more databases 106. The contextual search ranking system 102 may be connected to one or more document storage devices 110A-110N and one or more user devices 112A-112N through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof.

In some embodiments, the contextual search ranking system 102 may be configured to contextually index sets of electronic documents stored in one or more document storage devices 110A-110N. For example, the contextual search ranking system 102 may be configured to receive a set of electronic documents from one or more document storage devices 110A-110N. Each electronic document in the set of electronic documents may comprise a set of sentences. The contextual search ranking system 102 may be further configured to generate a contextual index for the set of electronic documents. For instance, the contextual search ranking system 102 may identify a set of terms for each sentence and associate each term in the set of terms with one or more contexts in a set of contexts. In some embodiments, the contextual search ranking system 102 may be configured to perform preprocessing of electronic documents stored in one or more document storage devices 110A-110N and query processing of electronic search queries received from one or more user devices 112A-112N as described in further detail below.

The contextual search ranking system 102 may be embodied as one or more computers or computing systems and may comprise one or more server devices 104 and one or more databases 106. The one or more server devices 104 may be embodied as one or more servers, remote servers, cloud-based servers (e.g., cloud utilities), processors, any other suitable server devices, or any combination thereof. The one or more server devices 104 receive, process, generate, and transmit data, signals, and electronic information to facilitate the operations of the contextual search ranking system 102. The one or more databases 106 may be embodied as one or more data storage devices, such as Network Attached Storage (NAS) devices or separate databases or servers. The one or more databases 106 include information accessed and stored by the contextual search ranking system 102 to facilitate the operations of the contextual search ranking system 102. For example, the one or more databases 106 may store user account credentials for users of one or more document storage devices 110A-110N, one or more user devices 112A-112N, or a combination thereof. In another example, the one or more databases 106 may store data regarding device characteristics of various document storage devices 110A-110N, user devices 112A-112N, or a combination thereof. In another example, the one or more databases 106 may store one or more sets of contexts and one or more contextual indices of one or more sets of electronic documents.

In some embodiments, the contextual search ranking system 102 may be configured to contextually index sets of electronic documents stored in one or more document storage devices 110A-110N. For example, the contextual search ranking system 102 may be configured to receive a set of electronic documents from one or more document storage devices 110A-110N. Each electronic document in the set of electronic documents may comprise a set of sentences. In some instances, the contextual search ranking system 102 may be configured to identify the set of terms for each sentence based on natural language processing (NLP). The contextual search ranking system 102 may be further configured to generate a contextual index for the set of electronic documents. For instance, the contextual search ranking system 102 may identify a set of terms for each sentence and associate each term in the set of terms with one or more contexts in a set of contexts (e.g., a hierarchical set of contexts). The contextual search ranking system 102 may be further configured to generate, based on the set of terms, a context score for each sentence with respect to each context in the set of contexts. The contextual search ranking system 102 may be further configured to generate a contextual index that associates each sentence with one or more of the contexts in the set of contexts based on the context score. In some instances, where the set of contexts is a hierarchical set of contexts, the contextual search ranking system 102 may be further configured to generate a pathscore for each sentence with respect to each context in the hierarchical set of contexts and generate a contextual index that associates each sentence with one or more of the contexts in the set of contexts based on the pathscore. In some instances, the contextual search ranking system 102 may be further configured to generate a contextual index that associates each sentence with the one or more of the contexts in the set of contexts based on supervised text classification.

In some embodiments, the contextual search ranking system 102 may be configured to generate contextual search rankings in response to electronic search queries provided by users. For instance, the contextual search ranking system 102 may be configured to receive, from one or more user devices 112A-112N, an electronic search query provided by a user using one or more user devices 112A-112N. The electronic search query may comprise a plurality of search terms. The contextual search ranking system 102 may be further configured to generate a contextual search ranking for a subset of the set of electronic documents based on the search terms and the contextual index. In some instances, the contextual search ranking system 102 may be further configured to generate contextual field level normalization information based on the set of terms and generate the contextual search ranking further based on the contextual field level normalization information. In some instances, the contextual search ranking system 102 may be further configured to generate keyword strength information based on the set of sentences and the set of terms and generate the contextual search ranking further based on the keyword strength information. In some instances, the contextual search ranking system 102 may be further configured to generate context strength information based on the context score and generate the contextual search ranking further based on the context strength information. In some instances, where the set of contexts comprises a hierarchical set of contexts, the contextual search ranking system 102 may be further configured to generate a pathscore for each sentence with respect to each context in the hierarchical set of contexts and generate the context strength information further based on the pathscore. In some instances, the contextual search ranking system 102 may be further configured to generate relevancy ranking information for each electronic document based on one or more of contexts and generate the contextual search ranking further based on the relevancy ranking information. In some instances, the contextual search ranking system 102 may be further configured to generate a cumulative ranking score for each electronic document based on the relevancy ranking information and generate the contextual search ranking further based on the cumulative ranking score for each electronic document. In some embodiments, the contextual search ranking system 102 may be further configured to transmit the contextual search ranking to the one or more user devices 112A-112N.

In some embodiments, the contextual search ranking system 102 may be further configured to generate user interface data based on the contextual search ranking. The user interface data may be configured to be displayed by a display device, such as one or more user devices 112A-112N. In some embodiments, the contextual search ranking system 102 may be further configured to transmit the user interface data to the display device, such as the one or more user devices 112A-112N.

The one or more document storage devices 110A-110N may be embodied by any suitable computing device. In some embodiments, the one or more document storage devices 110A-110N may be embodied as one or more data storage devices, such as one or more NAS devices, or as one or more separate databases or database servers. In some embodiments, the one or more document storage devices 110A-110N may be embodied as one or more servers, remote servers, cloud-based servers (e.g., cloud utilities), processors, or any other suitable devices, or any combination thereof. In some embodiments, the one or more document storage devices 110A-110N may receive, process, store, generate, and transmit data, signals, and electronic information (including, but not limited to, electronic documents and sets of electronic documents) to facilitate the operations of the contextual search ranking system 102. Information received by the contextual search ranking system 102 from one or more document storage devices 110A-110N may be provided in various forms and via various methods. It will be understood, however, that in some embodiments, the one or more document storage devices 110A-110N need not themselves be databases or database servers, but may be peripheral devices communicatively coupled to databases or database servers. In some embodiments, the one or more document storage devices 110A-110N may include or store various data and electronic information associated with one or more sets of electronic documents. For example, the one or more document storage devices 110A-110N may include or store a set of electronic documents, an index (e.g., a contextual index) for the set of electronic documents, a set of contexts (e.g., a hierarchical set of contexts) any other suitable information, or any combination thereof.

The one or more user devices 112A-112N may be embodied by any computing device known in the art. Information received by the contextual search ranking system 102 from the one or more user devices 112A-112N may be provided in various forms and via various methods. For example, the one or more user devices 112A-112N may be laptop computers, smartphones, netbooks, tablet computers, wearable devices, desktop computers, electronic workstations, or the like, and the information may be provided through various modes of data transmission provided by these user devices. In some embodiments, the one or more user devices 112A-112N may include or store various data and electronic information associated with one or more users. For example, the one or more user devices 112A-112N may include or store one or more electronic search queries provided by one or more users using the one or more user devices 112A-112N. In another example, the one or more user devices 112A-112N may include or store one or more contextual search rankings received from the contextual search ranking system 102. In some embodiments, the one or more user devices 112A-112N may include or store user interface data, user information for one or more users, historical search information for one or more users, or a combination thereof. In some embodiments, the one or more user devices 112A-112N may be associated with one or more users who provided one or more electronic search queries.

In embodiments where a user device 112 is a mobile device, such as a smartphone or tablet, the mobile device may execute an "app" (e.g., a thin-client application) to interact with the contextual search ranking system 102, one or more document storage devices 110A-110N, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., document storage devices, user devices). Communication with hardware and software modules executing outside of the app is typically provided via APIs provided by the mobile device operating system.

Additionally or alternatively, the one or more document storage devices 110A-110N, the one or more user devices 112A-112N, or any combination thereof may interact with the contextual search ranking system 102 over one or more communications networks 108. As yet another example, the one or more document storage devices 110A-110N and the one or more user devices 112A-112N may include various hardware or firmware designed to interface with the contextual search ranking system 102. For example, an example document storage device 110A may be a database server modified to communicate with the contextual search ranking system 102, and another example document storage device 110B may be a purpose-built device offered for the primary purpose of communicating with the contextual search ranking system 102. As another example, an example user device 112A may be a user's smartphone and may have an application stored thereon facilitating communication with the contextual search ranking system 102, whereas another example user device 112B may be a purpose-built device (e.g., a kiosk computing device) offered for the primary purpose of communicating with the contextual search ranking system 102.

Example Implementing Apparatus

Figure 2:
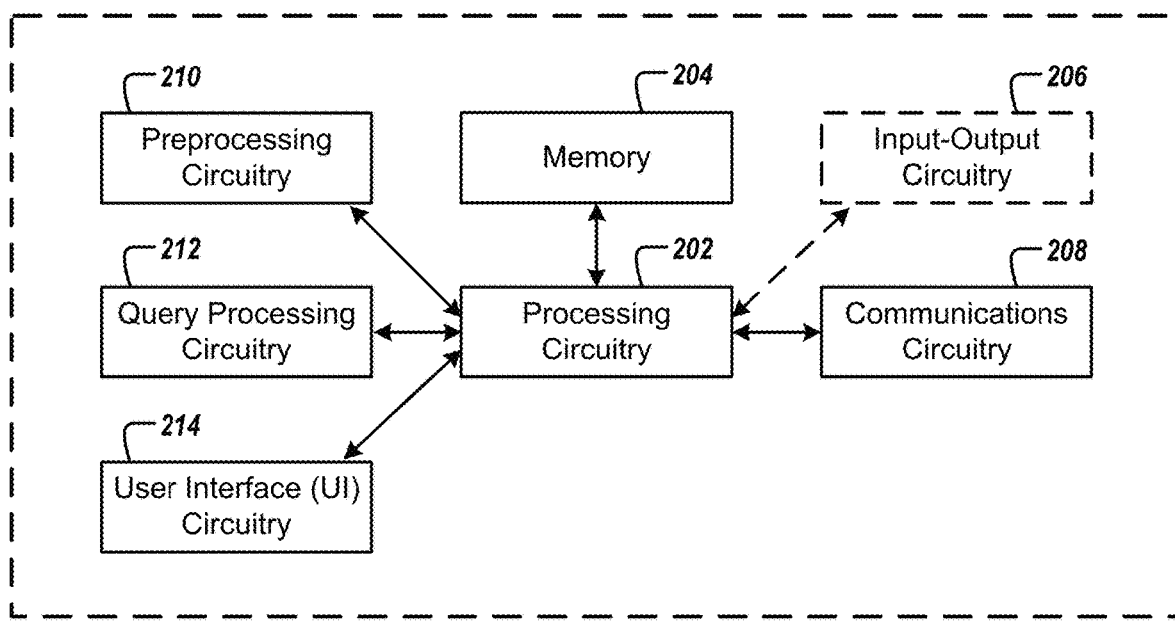
FIG. 2 illustrates a schematic block diagram of example circuitry that may perform various operations in accordance with some example embodiments described herein.

The contextual search ranking system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, preprocessing circuitry 210, query processing circuitry 212, and user interface circuitry 214. The apparatus 200 may be configured to execute the operations described above with respect to FIG. 1 and below with respect to FIGS. 3-14. Although some of these components 202-214 are described with respect to their functional capabilities, it should be understood that the particular implementations necessarily include the use of particular hardware to implement such functional capabilities. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data and electronic information associated with one or more users and one or more sets of electronic documents. In some instances, the memory 204 may be configured to store one or more sets of electronic documents, sets of sentences for each document, sets of terms for each sentence, sets of contexts (e.g., hierarchical sets of contexts), associations between terms and contexts, context scores, pathscores, supervised text classifications, associations between sentences and contexts, and combinations thereof. In some instances, the memory 204 may be configured to store one or more electronic search queries, search terms, contextual field level normalization information, keyword strength information, context strength information, relevancy ranking information, cumulative ranking scores, contextual search rankings, subsets of electronic documents, and combinations thereof. In some instances, the memory 204 may be configured to store user interface data. It will be understood that the memory 204 may be configured to store any electronic information, data, data structures, documents, sentences, terms, contexts, requests, queries, scores, classifications, rankings, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as an electronic search query provided by a user. The input-output circuitry 206 may comprise a user interface and may include a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate (e.g., using processing circuitry 202, user interface circuitry 214, or both) user interface data for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The preprocessing circuitry 210 includes hardware components designed or configured to contextually index sets of electronic documents. In some embodiments, the preprocessing circuitry 210 may be in communication with one or more document storage devices (e.g., one or more document storage devices 110A-110N) and thus configured to receive a set of electronic documents from one or more document storage devices. Each electronic document in the set of electronic documents may comprise a set of sentences. In some instances, the preprocessing circuitry 210 may be configured to identify the set of terms for each sentence based on NLP. The preprocessing circuitry 210 may be further configured to generate a contextual index for the set of electronic documents. For instance, the preprocessing circuitry 210 may identify a set of terms for each sentence and associate each term in the set of terms with one or more contexts in a set of contexts (e.g., a hierarchical set of contexts). The preprocessing circuitry 210 may be further configured to generate, based on the set of terms, a context score for each sentence with respect to each context in the set of contexts. The preprocessing circuitry 210 may be further configured to generate a contextual index that associates each sentence with one or more of the contexts in the set of contexts based on the context score. In some instances, where the set of contexts is a hierarchical set of contexts, the preprocessing circuitry 210 may be further configured to generate a pathscore for each sentence with respect to each context in the hierarchical set of contexts and generate a contextual index that associates each sentence with one or more of the contexts in the set of contexts based on the pathscore. In some instances, the preprocessing circuitry 210 may be further configured to generate a contextual index that associates each sentence with the one or more of the contexts in the set of contexts based on supervised text classification. In some embodiments, the preprocessing circuitry 210 may be further configured to transmit the contextual index to the one or more document storage devices, the query processing circuitry 212, or both.

The query processing circuitry 212 includes hardware components designed or configured to contextually search sets of electronic documents in response to electronic search queries received from user devices. In some embodiments, the query processing circuitry 212 may be in communication with a user device (e.g., one or more user devices 112A-112N) and thus configured to receive an electronic search query from the user device. The electronic search query may comprise a plurality of search terms. In some embodiments, the query processing circuitry 212 may be in communication with a computing device (e.g., one or more server devices 104, one or more databases 106, one or more document storage devices 110A-110N) and thus configured to receive a contextual index for a set of electronic documents from the computing device. The query processing circuitry 212 may be further configured to generate a contextual search ranking for a subset of the set of electronic documents based on the search terms and the contextual index. In some instances, the query processing circuitry 212 may be further configured to generate contextual field level normalization information based on the set of terms and generate the contextual search ranking further based on the contextual field level normalization information. In some instances, the query processing circuitry 212 may be further configured to generate keyword strength information based on the set of sentences and the set of terms and generate the contextual search ranking further based on the keyword strength information. In some instances, the query processing circuitry 212 may be further configured to generate context strength information based on the context score and generate the contextual search ranking further based on the context strength information. In some instances, where the set of contexts comprises a hierarchical set of contexts and the preprocessing circuitry 210 is configured to generate a pathscore for each sentence with respect to each context in the hierarchical set of contexts, the query processing circuitry 212 may be further configured to receive the pathscore from the preprocessing circuitry 210 and generate the context strength information further based on the pathscore. In some instances, the query processing circuitry 212 may be further configured to generate relevancy ranking information for each electronic document based on one or more of contexts and generate the contextual search ranking further based on the relevancy ranking information. In some instances, the query processing circuitry 212 may be further configured to generate a cumulative ranking score for each electronic document based on the relevancy ranking information and generate the contextual search ranking further based on the cumulative ranking score for each electronic document. In some embodiments, the query processing circuitry 212 may be further configured to transmit the contextual search ranking to the one or more user devices, the input-output circuitry 206, the user interface circuitry 214, or a combination thereof. In some embodiments, the preprocessing circuitry 210 and the query processing circuitry 212 may be the same.

The user interface circuitry 214 includes hardware components designed or configured to analyze and generate user interface data. In some embodiments, the user interface circuitry 214 may be further configured to generate user interface data based on the contextual search ranking. The user interface data may be configured to be displayed by a display device, such as a user device (e.g., one or more user devices 112A-112N). In some embodiments, the user interface circuitry 214 may be further configured to transmit the user interface data to the display device, the input-output circuitry 206, or both. For example, the user interface circuitry 214 may be configured to generate user interface data and transmit the generated user interface data to the input-output circuitry 206, and the input-output circuitry 206 may be configured to receive the user interface data and display the received user interface data on one or more display screens.

In some embodiments, the user interface circuitry 214 includes hardware components designed or configured to generate the user interface data based on any electronic information, data, data structures, documents, sentences, terms, contexts, requests, queries, scores, classifications, rankings, embodiments, examples, figures, techniques, processes, operations, methods, systems, apparatuses, or computer program products described herein, or any combination thereof. For instance, the user interface circuitry 214 includes hardware components designed or configured to generate the user interface data based on any embodiment or combination of embodiments described with reference to FIGS. 1-14.

It should also be appreciated that, in some embodiments, each of the preprocessing circuitry 210, query processing circuitry 212, and user interface circuitry 214 may include a separate processor, specially configured field programmable gate array (FPGA), application specific interface circuit (ASIC), or cloud utility to perform the above functions. In some embodiments, the hardware components described above with reference to preprocessing circuitry 210, query processing circuitry 212, and user interface circuitry 214 may utilize communications circuitry 208 or any suitable wired or wireless communications path to communicate with a document storage device (e.g., one or more of document storage devices 110A-110N), a user device (e.g., one or more of user devices 112A-112N), each other, or any other suitable circuitry or device. In some embodiments, one or more of the preprocessing circuitry 210, query processing circuitry 212, and user interface circuitry 214 may be hosted locally by the apparatus 200. In some embodiments, one or more of the preprocessing circuitry 210, query processing circuitry 212, and user interface circuitry 214 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the preprocessing circuitry 210, query processing circuitry 212, and user interface circuitry 214.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The document storage devices 110A-110N and user devices 112A-112N may be embodied by one or more computing devices or systems that also may include processing circuitry, memory, input-output circuitry, and communications circuitry. For example, a document storage device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a user device 112 may be a smartphone on which an app (e.g., a mobile database app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data (e.g., electronic documents, contextual indices, electronic search queries, search results, contextual search rankings, or the like) with the contextual search ranking system described herein.

Example Implementing System

Figure 3:
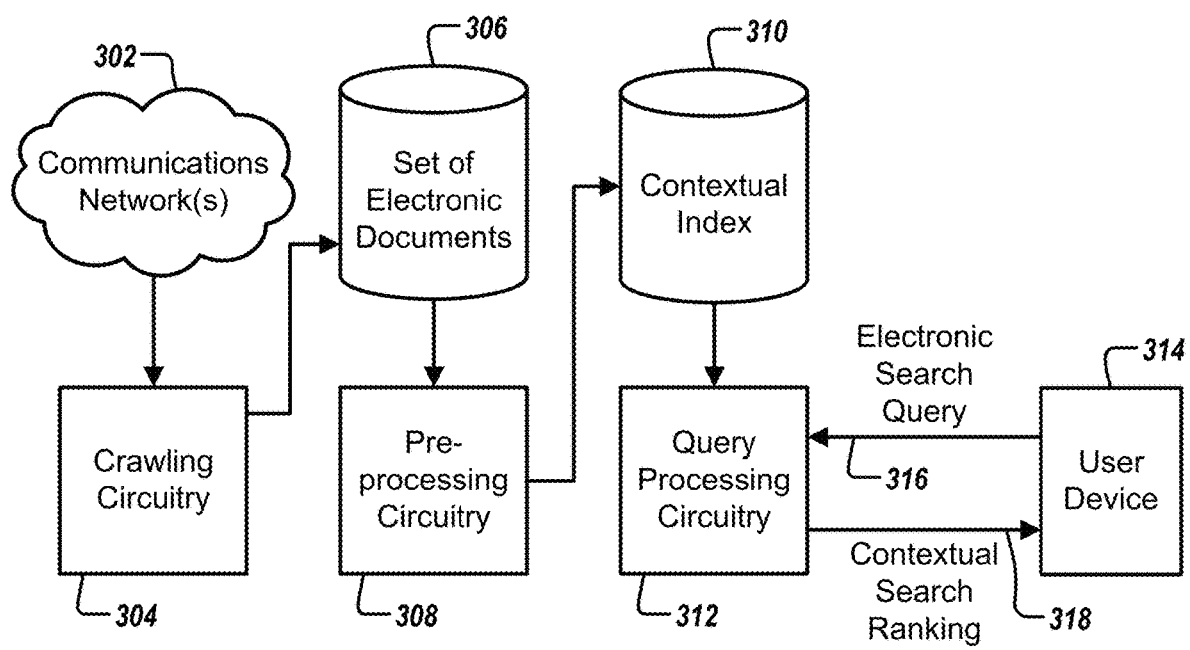
FIG. 3 illustrates a system diagram of a set of devices that may be involved in some example embodiments described herein.

FIG. 3 illustrates a schematic diagram of an example system 300 comprising a set of devices that may be involved in some example embodiments described herein. In accordance with some example embodiments, example system 300 may include: crawling circuitry 304 in communication with one or more communications networks 302 (e.g., the Internet); document storage device 306; preprocessing circuitry 308; database 310; query processing circuitry 312; and user device 314. The crawling circuitry 304 may be configured to crawl the one or more communications networks 302 to locate and retrieve electronic documents. In some embodiments, the crawling circuitry may be configured to generate a set of contexts, such as a context hierarchy, a context tree, a context table, a context map, a hierarchical set of contexts, or any other suitable set of contexts. For example, in a healthcare field, the crawling circuitry 304 may generate a first set of contexts for headaches (e.g., a headache context tree), and a second set of contexts for cancer (e.g., a cancer context tree). The crawling circuitry 304 may be further configured to transmit the documents and the set of contexts to document storage device 306. The document storage device 306 may be configured to receive and store the electronic documents as a set of electronic documents (e.g., a document collection). The document storage device 306 may be further configured to transmit the set of electronic documents to preprocessing circuitry 308.

The preprocessing circuitry 308 may be configured to receive and index the set of electronic documents ingested by the crawling circuitry 304. For instance, the preprocessing circuitry 308 may be configured to contextually index the set of electronic documents stored in the document storage device 306. In one illustrative example, the preprocessing circuitry 308 may be configured to receive a set of electronic documents from the document storage device 306. Each electronic document in the set of electronic documents may comprise a set of sentences. In some instances, the preprocessing circuitry 308 may be configured to identify the set of terms for each sentence based on NLP. The preprocessing circuitry 308 may be further configured to generate a contextual index for the set of electronic documents. For instance, the preprocessing circuitry 308 may identify a set of terms for each sentence and associate each term in the set of terms with one or more contexts in a set of contexts (e.g., a hierarchical set of contexts). The preprocessing circuitry 308 may be further configured to generate, based on the set of terms, a context score for each sentence with respect to each context in the set of contexts. The preprocessing circuitry 308 may be further configured to generate a contextual index that associates each sentence with one or more of the contexts in the set of contexts based on the context score. In some instances, where the set of contexts is a hierarchical set of contexts, the preprocessing circuitry 308 may be further configured to generate a pathscore for each sentence with respect to each context in the hierarchical set of contexts and generate a contextual index that associates each sentence with one or more of the contexts in the set of contexts based on the pathscore. In some instances, the preprocessing circuitry 308 may be further configured to generate a contextual index that associates each sentence with the one or more of the contexts in the set of contexts based on supervised text classification. The preprocessing circuitry may be further configured to transmit the contextual index to database 310. The database 310 may be configured to receive and store the contextual index. The database 310 may be further configured to transmit the contextual index to query processing circuitry 312.

The query processing circuitry 312 may be configured to receive an electronic search query 316 from user device 314 and retrieve the contextual index from database 310 for use in query processing the received electronic search query 316. For instance, the query processing circuitry 312 may be configured to generate a contextual search ranking 318 in response to the electronic search query 316. In one illustrative example, the query processing circuitry 312 may be configured to receive, from the user device 314, an electronic search query 316 provided by a user of the user device 314. The electronic search query 316 may comprise a plurality of search terms. The query processing circuitry 312 may be further configured to generate a contextual search ranking 318 for a subset of the set of electronic documents stored in document storage device 306 based on the search terms and the contextual index received from database 310. In some instances, the query processing circuitry 312 may be further configured to generate contextual field level normalization information based on the set of terms and generate the contextual search ranking 318 further based on the contextual field level normalization information. In some instances, the query processing circuitry 312 may be further configured to generate keyword strength information based on the set of sentences and the set of terms and generate the contextual search ranking 318 further based on the keyword strength information. In some instances, the query processing circuitry 312 may be further configured to generate context strength information based on the context score and generate the contextual search ranking 318 further based on the context strength information. In some instances, where the set of contexts comprises a hierarchical set of contexts, the query processing circuitry 312 may be further configured to generate a pathscore for each sentence with respect to each context in the hierarchical set of contexts and generate the context strength information further based on the pathscore. In some instances, the query processing circuitry 312 may be further configured to generate relevancy ranking information for each electronic document based on one or more of contexts and generate the contextual search ranking 318 further based on the relevancy ranking information. In some instances, the query processing circuitry 312 may be further configured to generate a cumulative ranking score for each electronic document based on the relevancy ranking information and generate the contextual search ranking 318 further based on the cumulative ranking score for each electronic document.

In some embodiments, the query processing circuitry 312 may be further configured to transmit the contextual search ranking 318 to the user device 314. In some embodiments, the query processing circuitry 312, or user interface circuitry in communication with the query processing circuitry 312, may be configured to generate user interface data based on the contextual search ranking and transmit the user interface data to the user device 314 for display by the user device 314. For example, the contextual search ranking 318, the user interface data, or both may be an ordered list of documents, where the order of the list is based on the relevancy rankings of those documents. In another example, the contextual search ranking 318, the user interface data, or both may be a contextual hierarchy of documents as discussed in further detail with reference to FIG. 13B.

Example Preprocessing System

Figure 4:
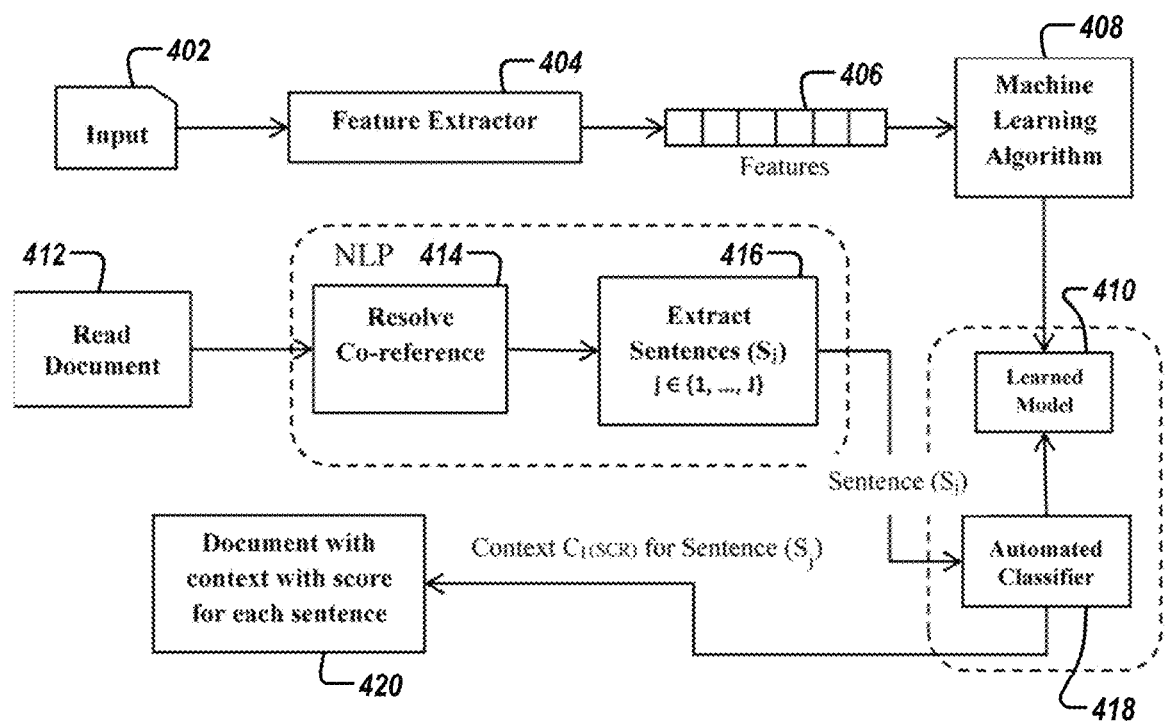
FIG. 4 illustrates an example process flow that may be involved in some example embodiments described herein.

FIG. 4 illustrates an example process flow 400 that may be involved in some example embodiments described herein. In some embodiments, the example process flow 400 illustrates the functionality of specialized preprocessing circuitry referred to herein as an intelligent context tagger (ICT) system. In some embodiments, an electronic document may comprise many different paragraphs, which in turn may comprise a collection of sentences. Every sentence presents a particular context. The task of assigning a sentence to one or more contexts may be done manually (e.g., intellectually) or by various machine learning algorithms (e.g., automatic text classification). Automatic text classification may be divided into three types: supervised text classification; unsupervised text classification; and semi-supervised text classification. In some embodiments, the ICT system may use NLP and supervised text classification as preprocessing steps to identify different context present in a single document from a predetermined set of contexts. This set may be represented using different data structures, such as a list (e.g., an ordered list), a hierarchy (e.g., a hierarchy tree), or any other suitable data structure.

In some embodiments, the ICT system receives input at step 402 and sent to a feature extractor at step 404. The feature extractor is configured to extract one or more features from the input. The extracted features are shown at step 406, and are sent to a machine learning algorithm at step 408. The machine learning algorithm then outputs electronic information to a learned model at step 410.

In some embodiments, the ICT system processes one or more electronic documents by reading each electronic document at step 412, using NLP to resolve co-reference (e.g., by identifying two or more expressions in a text that refer to the same person or thing) at step 414, and using NLP to identify and extract different sentences at step 416. The resolution of co-reference at step 414 facilitates the association of co-referring sentences with the same context or contexts. The ICT system then transmits the extracted sentences to an automated classifier at step 418. The automated classifier then outputs electronic information to the learned model at step 410.

In some embodiments, the ICT system then implements a supervised machine learning technique that uses "learning sets" to identify key attributes of a sentence in a context. In some embodiments, the "learning sets" are small sub-collections, one for each context, generated by one or more analysts that decided which test sentence should appear in each context. The ICT system compares new sentences to the learning collections and assigns the new sentences to a context based on their similarity to the sentences that have already been assigned to the context. The ICT system then scores every sentence in relation to every context and classifies a sentence into a context if its context score is above some predetermined threshold.

In some embodiments, a document $D_i$ is an ordered collection of different sentences $S_j$:

$$D_i = \{S_j\}; i \in \{1, \ldots, I\}, j \in \{1, \ldots, J\}$$

In some embodiments, the ordered collection of different sentences $S_j$ is a collection of different keywords $KW_k$:

$$S_j = \{KW_k\}; k \in \{1, \ldots, K\}$$

In some embodiments, the ICT system uses a predetermined context $C_l$ where $l \in \{1, \ldots, L\}$ to decide the context of the given sentence $S_j$ with a context score of SCR. In some embodiments, the ICT system generates components A-H to store information extracted, processed, and generated during preprocessing phase. These components are discussed in further detail below with reference to FIGS. 5-12.

FIG. 5 illustrates example extracted information 500 that may be involved in some example embodiments described herein. For example, the extracted information 500 may correspond to component A for use in providing master data of extracted information. The component A may be broken down into various components as described below.

FIG. 6 illustrates example term-sentence-term location information 600 that may be involved in some example embodiments described herein. For example, the term-sentence-term location information 600 may correspond to component B for use in providing term sentence associations. The component B comprises aggregations of terms with respect to the available terms (e.g., as represented in the first and second columns of the example term-sentence-term location information 600), recognized sentence (e.g., as represented in the third column) and term location (e.g., as represented in the fourth columns) in a sentence for a document.

Figure 7:
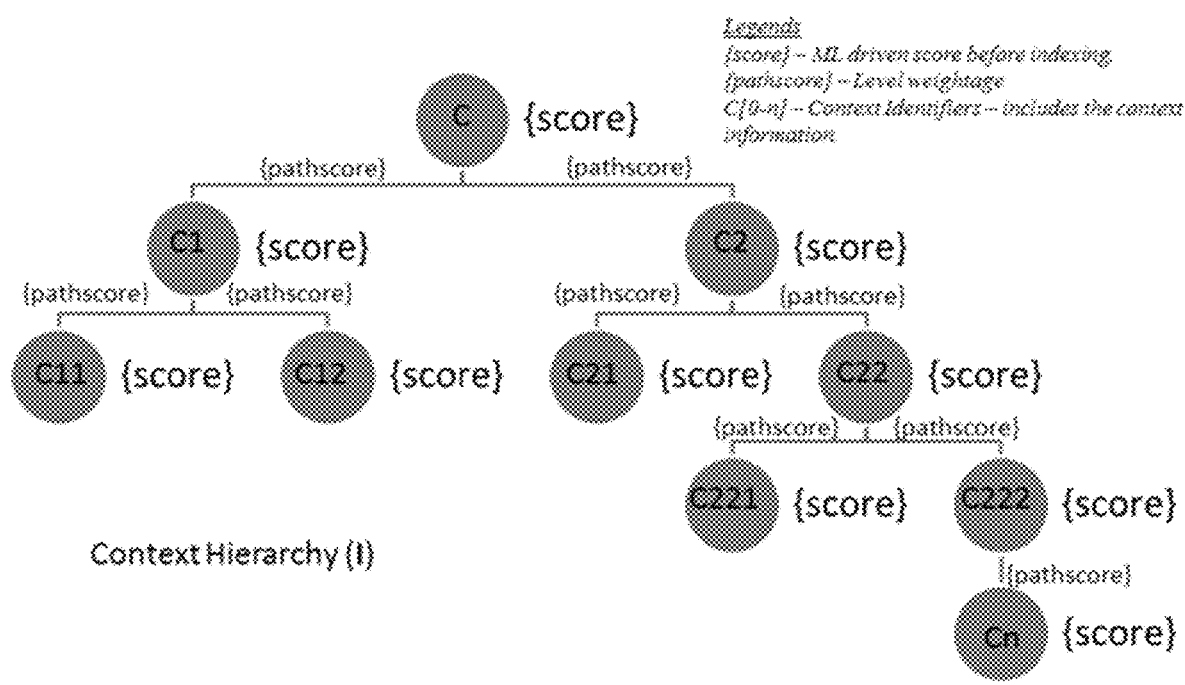
FIG. 7 illustrates an example context hierarchy that may be involved in some example embodiments described herein.

FIG. 7 illustrates an example context hierarchy 700 that may be involved in some example embodiments described herein. For example, the example context hierarchy 700 may correspond to component I for providing hierarchical context information with score. The component I represents the predefined context hierarchy that may be used to store the defined sentence score (e.g., the context score) output by the ICT system. The sentence score represented as {score} and the level of hierarchy represented as {pathscore} will be used by the query processing circuitry as a part of the relevancy ranking generation.

FIG. 8 illustrates example context information 800 that may be involved in some example embodiments described herein. For example, the example context information 800 may correspond to component C for providing context name and identification mapping information. The component C stores the information captured for a context. When the Edit column contains the number zero, the context is removed from component I. When the Edit column contains the number one, the context is available in component I.

FIG. 9 illustrates example sentence information 900 that may be involved in some example embodiments described herein. For example, the example sentence information 900 may correspond to component D for providing sentence details in a document. The Component D stores the information captured for sentences available in documents.

FIG. 10 illustrates example term information 1000 that may be involved in some example embodiments described herein. For example, the example term information 1000 may correspond to component E for providing term identification and dictionary mapping information. The Component E stores information for terms identified in documents.

FIG. 11 illustrates an example inverted matrix 1100 of sentences for terms, contexts, and documents comprising example term-sentence information 1110, example context-sentence information 1120, and example document-sentence information 1130 that may be involved in some example embodiments described herein. For example, the example term-sentence information 1110 may correspond to component F for providing term identification mapping with sentences. In another example, the example context-sentence information 1120 may correspond to component G for providing context-sentence mapping information. In another example, the example document-sentence information 1130 may correspond to component H for providing document-sentence mapping information. In other words, the components F, G and H represent the relationship between terms, sentences, context and documents.

It will be understood that the components A-I discussed above with reference to FIGS. 5-11 represent a simplistic form of a generated contextual index to be used in calculating relevancy rankings as discussed in further detail below.

Example Query Processing System

The following algorithm illustrates some example query processing techniques that may be involved in some example embodiments for generating a context-based relevancy ranking of a corpus in a search system. The following algorithm may be implemented by any suitable system (e.g., contextual search ranking system 102), apparatus (e.g., apparatus 200), or circuitry (e.g., query processing circuitry 212) disclosed herein.

Assumptions:
1. i is a number such that 0<i≤N where 0<N<∞
2. Query terms are represented as QTi, assumed minimum count of terms used in query is 2
3. Searched Results are represented as SRi
4. Extracted Contexts are represented as Ci
   a. Context of Sentence (Segment)
   b. Sub Context of the Documents SCi
5. Keyword Scores are represented as KWi, Keyword Score may also include:
   a. Edit Distance Score
   b. Root Words and its affinity towards the actual searched keys with respect to indexed Context
   c. Word Senses and its relations Term Frequency (TF). The term frequency calculation may vary between different syntactic systems. Components B, F, and H may be used to compute term frequency according to the following equation (which is only one of many suitable formulas which may be used to normalize the term frequency value):

$$TF_{Document} = \sqrt{\text{frequency of term}_{Document}}$$

Inverse Document Frequency (IDF). Components B, F, and H may be used to compute IDF according to the following equation:

$$IDF_{Terms} = 1 + \log\left(\frac{Count_{Document}}{\text{frequency of } terms_{Document} + 1}\right)$$

Contextual Field Level Normalization. Components F, G, and H may be used to compute contextual field level normalization according to the following equation:

$$Field_{norm} = \frac{1}{\sqrt{Count_{terms}}}$$

Keyword Strength. Keyword strength represents the keyword score with respect to context. Components B, F, G, and H may be used to compute keyword strength according to the following equation:

Keyword Strength =

$$\log((|Sentence_i Term1_{location} - Sentence_i Term2_{location}|) +$$
$$(|Sentence_i Term1_{location} - Sentence_i Term3_{location}|))$$

The permutation of t terms given r times during query are represented by the following equation:

$$_tP_r = t(t-1)(t-2)(t-3) \ldots (t-r+1) = \frac{t!}{(t-r)!}$$

Edit Distance. Edit distance may be used while searching the set of electronic documents. Edit distance may be computed according to the following equations:

$$dj = \begin{cases} 0 & \text{if } m = 0 \\ 1/3\left(\frac{m}{|s1|} + \frac{m}{|s2|} + \frac{m-t}{m}\right) & \text{otherwise} \end{cases}$$

Where
m is the number of matching characters, and
t is half the number of transpositions.

$$dw = dj + (lp(1-dj))$$

$$D_w = \frac{1}{3}\left(\frac{m}{|s1|} + \frac{m}{|s2|} + \frac{m-t}{m}\right) + \left(n*0.1\left(1 - \left(\frac{1}{3}\left(\frac{m}{|s1|} + \frac{m}{|s2|} + \frac{m-t}{m}\right)\right)\right)\right)$$

Where
dj is the Jaro distance for strings s1 and s2,
dw is the Jaro-Winkler distance for s1 and s2,
l is the length of common prefix at the start of the string up to a maximum of 4 characters,
p is a constant scaling factor for how much the score is adjusted upwards for having common prefixes, and
n is a count of characters to be considered for edit distance.

In some embodiments, regular expression may also be used in the above distance scoring computation. In some embodiments, a Jacquard edit distance may be used to compute edit distance.

Context Strength. Components G, H, and I may be used to compute context strength according to the following equation, where component I is used to compute the context and pathscore:

$$Context_{strength} = \sum_{i=X}^{N} (Context_{Score} + Context_{pathscore})$$

Where $x=C_i, 0<i<N$

N=total number of context indexed

In some embodiments, the algorithm to calculate the total hierarchical weightage for a given context Ci at the Query Time in a component I is:
1. Traverse Context Tree
   a. Once the required node Ci is reached
   b. Traverse backward to parent node
      i. Add the child node value and the parent node value
      ii. Add the traversal path cost.
   c. Repeat step "b" for all node until the root is reached
      i. Get the sum of all the nodes that was travelled as a part of path to reach the root node.
      ii. Add the traversal path values.

Relevancy Ranking (RR). Components A-I may be used to compute relevancy ranking according to the following equation:

$$RR = \left( \sqrt{\text{frequency of } term_{Document}} + \left(1 + \log\left(\frac{Count_{Document}}{\text{frequency of } terms_{Document} + 1}\right)\right) \right) + \frac{1}{\sum |\log(\sqrt{Count_{terms}})|} + \sum_{x=0}^{i} keywordStrength + \sum_{x=1}^{i} Context_{Strength}$$

Example Use Case

Having described example embodiments in general terms, the following example embodiments are provided to further illustrate a use case of some example embodiments. In some instances, the following example embodiments provide examples of how the contextual search ranking system disclosed herein may generate a contextual search ranking based on an electronic search query and a contextual index.

"Online Search of Healthcare Content" is an illustrative example use case wherein a person provides an electronic search query for electronic documents in an attempt to answer his or her own health questions at home in order to make a personal choice about whether and when to consult a clinician. Many people now have added the Internet to their personal health toolbox, helping themselves and their loved ones better understand what might be ailing them. For example, many adults have stated that at one time or another they have gone online specifically to try to figure out what medical condition they or someone else might have, but only a portion of those people have stated that a medical professional confirmed or partially confirmed their self-diagnosis. This example illustrates how important for healthcare content providers to serve the relevant content to the members to keep them healthy. Accordingly, the contextual search ranking system disclosed herein provides accurate and targeted search results in the form of contextual search rankings (e.g., search rankings based on context hierarchy), such as the contextual search ranking described in further detail with reference to FIG. 13B.

Context awareness is highly relevant to providing relevant healthcare content in response to user searcher. The healthcare industry is among the leading industries in the world when it comes to the sheer size of the manageable data an industry process in order to better serve their consumers. The current paradigm changes happening in the healthcare industry (e.g., Internet-of-things (IoT), wearable devices, and digitization of the electronic health record (EHR) and the electronic medical record (EMR)) is bound to increase the digital knowledge base to many folds in coming years. However, non-healthcare search systems do not possess the knowledge base that a Healthcare Organization possesses, and thus these non-healthcare search systems are not capable of serving the relevant content a user might be looking out for when they search for documents related to health, drugs, or symptoms specific to their sufferings.

In the coming years, the Internet will play an increasingly important role in preventive care or in obtaining a second line of advice through a trusted channel. With the promulgation of data sources through added physical hardware sources like wearables, IoT or virtual sources (e.g., digital EHR/EMR), a need exists to improve the search capability which can better utilize online data sources for accurate assistance to information seeking members. Contextualizing the healthcare data that healthcare organizations possess is an important step in providing better utilization in preventive care or support for members as well as providers who are looking on the Internet for some vital information concerning specific queries through a trusted source. Traditionally, contextualizing is expensive considering the complexity involved. In contrast to these traditional systems, the present disclosure provides a contextual search ranking system that contextualizes the data without losing out on simplicity of a searchable system. The contextual search ranking system disclosed herein is capable of servicing relevant, meaningful healthcare content to users, members, and providers with less time and in a more structured format that will reduce the cost of servicing that content.

In some embodiments, the contextual search ranking system disclosed herein may be integrated with a clinical portal to enable users to perform clinical searches. For example, existing clinical portals allow providers and doctors to interact with various medical related content such as line of treatment, impact of medicine, symptoms, clinical trial and the like. While doctors provide treatment, at times they rely on this content to make decisions about a particular clinical situation. The contextual search ranking system disclosed herein may be integrated with these clinical portals to enable users of those portals to efficiently search for unstructured clinical information.

FIGS. 12-13 illustrate an example implementation of the systems, apparatuses, circuitry, and algorithms that may be involved in some example embodiments described herein.

FIG. 12A illustrates an example set of sentences from an example set of electronic documents 1200 involved in the example implementation described herein with reference to FIGS. 12-13. As shown in FIG. 12A, the example set of electronic documents 1200 includes Document 1 and Document 2, each of which includes a different example set of sentences. The documents considered for the example implementation exhibit three contexts, "Cluster Headache," "Migraine," and "Others." During the preprocessing phase, the ICT system processes these documents and extracts the information to construct the components A-I as described below with reference to FIGS. 12B-12G.

FIG. 12B illustrates example term-sentence-term location information 1210 (component B). FIG. 12C illustrates example context information 1220 (component C). FIG. 12D illustrates example sentence information 1230 (component D). FIG. 12E illustrates example term-sentence information 1240 (component F). FIG. 12F illustrates example context-sentence information 1250 (component G). FIG. 12G illustrates example document-sentence information 1260 (component H).

In an example embodiment, the contextual search ranking system performs query processing with the electronic search query "headache left eye." The contextual search ranking system calculates a query score (e.g., a cumulative ranking score) for the two electronic documents shown in FIG. 12A (e.g., Document 1 and Document 2) and ranks those electronic documents based on the query score. The calculation details for Document 1 and Document 2 are provided below.

Query Score Calculation for Document 1

The contextual search ranking system receives the electronic search query "headache left eye".

The contextual search ranking system identifies the tokens "headache", "left", and "eye".

The contextual search ranking system generates term frequency information and inverse document frequency information based on components B, F, and H.

Headache
$$TF = \sqrt{6} = 2.44$$
$$IDF = \log\left(1 + \log\left(\frac{2}{6+1}\right)\right) = 0.34$$

Left
$$TF = \sqrt{1} = 1$$
$$IDF = \log\left(1 + \log\left(\frac{2}{1+1}\right)\right) = 0$$

Eye
$$TF = \sqrt{2} = 1.414$$
$$IDF = \log\left(1 + \log\left(\frac{2}{2+1}\right)\right) = 0.084$$

Left Eye
$$TF = \sqrt{1} = 1$$
$$IDF = \log\left(1 + \log\left(\frac{2}{1+1}\right)\right) = 0$$

Headache left eye
$$TF = \sqrt{0} = 0$$
$$IDF = \log\left(1 + \log\left(\frac{2}{0+1}\right)\right) = 0.11$$

Headache left
$$TF = \sqrt{0} = 0$$
$$IDF = \log\left(1 + \log\left(\frac{2}{0+1}\right)\right) = 0.11$$

Headache eye
$$TF = \sqrt{0} = 0$$
$$IDF = \log\left(1 + \log\left(\frac{2}{0+1}\right)\right) = 0.11$$

The contextual search ranking system generates contextual field level normalization information of a sentence based on components F, G, and H.

Context 1: All three terms "headache", "left" and "eye" have not fallen into any single sentence; thus the contextual field level normalization for these terms is 0. It will play part in adding the importance of a Document if in a Context it has a sentence that has all the queried terms. The "left" and "eye" token appears in a single sentence and the contextual field level normalization of that sentence in a context is $\sqrt{128}$=11.31, now 1/|log(11.31)|=0.94. The terms "headache" and "left" do not appear in any single sentence, thus the contextual field level normalization for these terms is 0. The terms "headache" and "eye" do not appear in any single sentence, thus the contextual field level normalization for these terms is 0.

Context 2: 0

Context 3: 0

The contextual search ranking system generates keyword strength information (e.g., keyword score with respect to context) based on components B, F, G, and H.

Context 1:
Location of Headache/s=2
Location of left=13
Location of eye=14 and 16

$$\text{Log}((|2-13|)+(|2-14|)+(|2-16|)+(|13-14|)+(|13-16|))$$
$$= \log(11+12+14+1+3) = \log(41) = 1.61$$

Context 2:
Location of Headache/s=6
Location of left=10
Location of eye=11 and 14

$$\log((|6-10|)+(|6-11|)+(|6-14|)+(|10-11|)+(|10-14|)+$$
$$(|11-14|)) = \log(4+5+8+1+4+3) = \log(25) = 1.39$$

Context 3:
Location of Headache/s=1, 5, 8
Location of left=0
Location of eye=0

$$\log((|1-0|)+(|5-0|)+(|8-0|)) = \log(14) = 1.14$$

The contextual search ranking system generates context strength information based on components G, H, and I. For example, the contextual search ranking system may generate context strength information assuming that the context values are as follows:

Context 1: Cluster Headache (0.95) for Sentences 1, 2, and 3 in Document 1

Context 2: Migraine (0.95) for Sentences 4, 5, 8, and 9 in Document 2

Context 3: Others (0.92) for Sentences 6 and 7 in Document 1 and Document 2

The contextual search ranking system generates relevancy ranking information (e.g., without contextual ranking algorithm) based on the term frequency information, inverse term frequency information, contextual field level normalization information, keyword strength information, and context strength information:

Context 1:
$$RR = 2.44 + 0.34 + 1 + 0 + 1.414 + 0.084 + 1 + 0 + 0 + 0.11 +$$
$$0 + 0.11 + 0 + 0.11 + 0.94 + 1.61 + 0.95$$
$$= 8.998$$

Context 2:
$$RR = 2.44 + 0.34 + 1 + 0 + 1.414 + 0.084 + 1 + 0 + 0 +$$
$$0.11 + 0 + 0.11 + 0 + 0.11 + 0 + 1.39 + 0.95$$
$$= 8.948$$

Context 3:

$$RR = 2.44 + 0.34 + 1 + 0 + 1.414 + 0.084 + 1 + 0 + 0 + \\ 0.11 + 0 + 0.11 + 0 + 0.11 + 0 + 1.14 + 0.92 \\ = 8.668$$

The contextual search ranking system generates cumulative ranking score information based on the relevancy ranking information. For example, the contextual search ranking system may generate the Cumulative Ranking Score=8.998+8.948+8.668=26.614, where the relevancy rankings within the documents are C1>C2>C3.

Query Score Calculation for Document 2

The contextual search ranking system receives the electronic search query "headache left eye".

The contextual search ranking system identifies the tokens "headache", "left", and "eye".

The contextual search ranking system generates term frequency information and inverse document frequency information based on components B, F, and H.

Headache $$TF = \sqrt{4} = 2$$

$$IDF = \log\left(1 + \log\left(\frac{2}{4+1}\right)\right) = 0.22$$

Left $$TF = \sqrt{1} = 1$$

$$IDF = \log\left(1 + \log\left(\frac{2}{1+1}\right)\right) = 0$$

Eye $$TF = \sqrt{2} = 1.414$$

$$IDF = \log\left(1 + \log\left(\frac{2}{2+1}\right)\right) = 0.084$$

Left Eye $$TF = \sqrt{1} = 1$$

$$IDF = \log\left(1 + \log\left(\frac{2}{1+1}\right)\right) = 0$$

Headache left eye $$TF = \sqrt{0} = 0$$

$$IDF = \log\left(1 + \log\left(\frac{2}{0+1}\right)\right) = 0.11$$

Headache left $$TF = \sqrt{0} = 0$$

$$IDF = \log\left(1 + \log\left(\frac{2}{0+1}\right)\right) = 0.11$$

Headache eye $$TF = \sqrt{0} = 0$$

$$IDF = \log\left(1 + \log\left(\frac{2}{0+1}\right)\right) = 0.11$$

The contextual search ranking system generates contextual field level normalization information of a sentence based on components F, G, and H.

Context 1: 0

Context 2: All three terms "headache", "left" and "eye" have not fallen into any single sentence; thus the contextual field level normalization for these terms is 0. It will play part in adding the importance of a Document if in a Context it has a sentence that has all the queried terms. The "left" and "eye" token appears in a single sentence and the contextual field level normalization of that sentence in a context is $\sqrt{15}$=3.87, now 1/|log (3.87)|=1.7. The terms "headache" and "left" do not appear in any single sentence, thus the contextual field level normalization for these terms is 0. The terms "headache" and "eye" do not appear in any single sentence, thus the contextual field level normalization for these terms is 0.

Context 3: 0

The contextual search ranking system generates keyword strength information (e.g., keyword score with respect to context) based on components B, F, G, and H.

Context 1:
Location of Headache/s=1
Location of left=0
Location of eye=0

$$\log(1)=0$$

Context 2:
Location of Headache/s=0
Location of left=10
Location of eye=11 and 14

$$\log((|10-11|)+(|10-14|)+(|11-14|)+(|10-0|)+(|11-0|)+(|14-0|))=\log(1+4+3+10+11+14)=\log(43) \\ =1.63$$

Context 3:
Location of Headache/s=1, 5, 8
Location of left=0
Location of eye=0

$$\log((|1-0|)+(|5-0|)+(|8-0|))=\log(14)=1.14$$

The contextual search ranking system generates context strength information based on components G, H, and I. For example, the contextual search ranking system may generate context strength information assuming that the context values are as follows:

Context 1: Cluster Headache (0.95) for Sentences 1, 2, and 3 in Document 1

Context 2: Migraine (0.95) for Sentences 4, 5, 8, and 9 in Document 2

Context 3: Others (0.92) for Sentences 6 and 7 in Document 1 and Document 2

The contextual search ranking system generates relevancy ranking information (e.g., without contextual ranking algorithm) based on the term frequency information, inverse term frequency information, contextual field level normalization information, keyword strength information, and context strength information:

Context 1:

$$RR = 2 + 0.22 + 1 + 0 + 1.414 + 0.084 + 1 + 0 + 0 + \\ 0.11 + 0 + 0.11 + 0 + 0.11 + 0 + 0 + 0.95 \\ = 6.998$$

Context 2:

$$RR = 2 + 0.22 + 1 + 0 + 1.414 + 0.084 + 1 + 0 + 0 + 0.11 + \\ 0 + 0.11 + 0 + 0.11 + 1.7 + 1.63 + 0.95 \\ = 10.218$$

Context 3:

$$RR = 2 + 0.22 + 1 + 0 + 1.414 + 0.084 + 1 + 0 + 0 + 0.11 +$$
$$0 + 0.11 + 0 + 0.11 + 0 + 1.14 + 0.92$$
$$= 8.108$$

The contextual search ranking system generates cumulative ranking score information based on the relevancy ranking information. For example, the contextual search ranking system may generate the Cumulative Ranking Score=6.998+ 10.218+8.108=25.324, where the relevancy rankings within the documents are C2>C3>C1.

In one example implementation, the outcome of the example implementation is that the contextual search ranking system ranks Document 1 above Document 2 because Cumulative Ranking Score for Document 1 (e.g., 26.614) is greater than the Cumulative Ranking Score for Document 2 (e.g., 25.324).

Figure 13A:
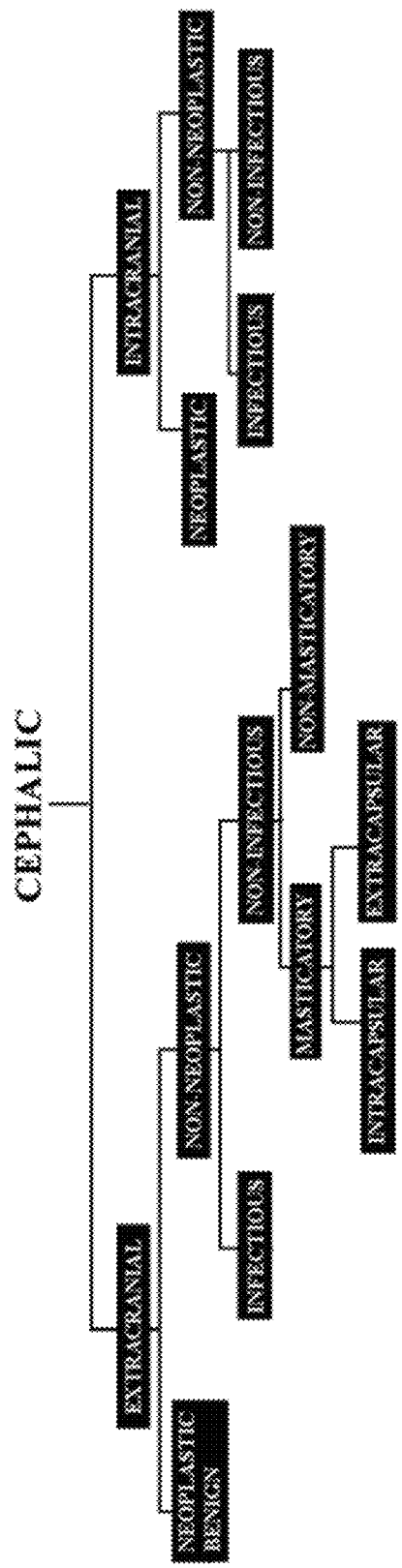
FIG. 13A illustrates an example context hierarchy that may be involved in some example embodiments described herein.

FIG. 13A illustrates an example context hierarchy 1300 that may be involved in some example embodiments described herein. As shown in FIG. 13A, example context hierarchy 1300 comprises a hierarchical set of contexts.

Figure 13B:
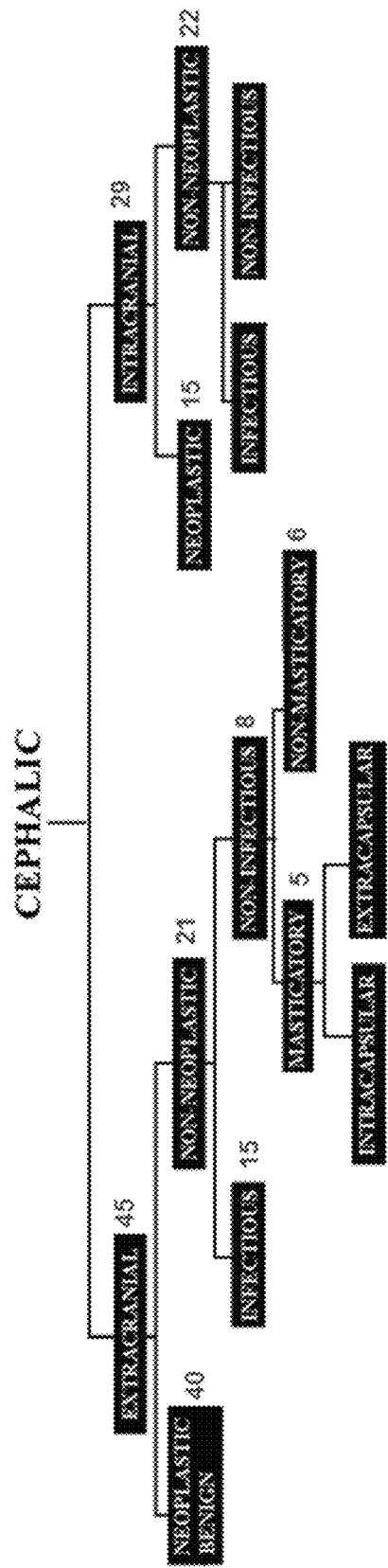
FIG. 13B illustrates an example contextual search ranking that may be involved in some example embodiments described herein.

FIG. 13B illustrates an example contextual search ranking 1310 that may be involved in some example embodiments described herein. FIG. 13B shows one example of number of documents surfaced based on search parameters classified into a context hierarchy of disease. For example, after contextual search ranking system performs the search according to FIGS. 12A-12G, the contextual search ranking system may determine document count (e.g., 45 for "EXTRACRANIAL" and the like) with the context. Accordingly, the contextual search ranking system provides for a context search that, in some embodiments, presents contextual search results in the form of a contextual search ranking (e.g., contextual search ranking 1310). In some embodiments, the contextual search ranking system may generate user interface data based on contextual search ranking 1310, where the user interface data is configured to be displayed on a display device, and subsequently transmit the generated user interface data to the display device. In one example, the user interface data may be configured to generate a display comprising the contextual search ranking 1310 as shown in FIG. 13B. In another example, the user interface data may be configured to generate a display different from the contextual search ranking 1310 as shown in FIG. 13B (e.g., an ordered list or the like). In some embodiments, the display device may receive the user interface data and generate a display screen based on the user interface data.

There are many benefits of the contextual search ranking system disclosed herein. Significant research work and case studies are happening in the medical science at a rapid pace. This evolution of medical and healthcare technology is bound to improve and at times change the way lines of treatment are decided. Doctors and researchers experience great difficulty in keeping pace with this dynamic evolution. However, it is a matter of importance that medical specialists be able to obtain relevant and specific content. This will reduce the time that they spend in browsing numerous documents before finding a relevant one. The contextual search ranking system disclosed herein greatly eases this process and enables healthcare content regarding the best known treatment to be provided.

In addition, the contextual search ranking system disclosed herein benefits enterprise searching. Generally, every enterprise has a well-defined area where their interests lie. In medium to large enterprises, the number of documents created are significantly large. Accordingly, it becomes very difficult to keep awareness between various organizations within the enterprise. For a growth of the enterprise it is important that all the knowledge generated within is well shared and available for any future need. The contextual search ranking system disclosed herein will reduce the time spent by these enterprises to browse numerous documents before finding a relevant document, such as the best document created by the enterprise.

Having described specific components of example devices involved in the present disclosure, example procedures for providing contextual indices and contextual search rankings are described below in connection with FIG. 14.

Example Operations for Providing Contextual Search Rankings

FIG. 14 illustrates an example flowchart 1400 that contains example operations for providing a contextual search ranking according to an example embodiment. The operations illustrated in FIG. 14 may, for example, be performed by one or more components described with reference to contextual search ranking system 102 shown in FIG. 1; by a document storage device 110 or a user device 112 in communication with contextual search ranking system 102; by apparatus 200 shown in FIG. 2; or by any combination thereof. In some embodiments, the various operations described in connection with FIG. 14 may be performed by the apparatus 200 by or through the use of one or more of processing circuitry 202, memory 204, input-output circuitry 206, communications circuitry 208, preprocessing circuitry 210, query processing circuitry 212, user interface circuitry 214, any other suitable circuitry, and any combination thereof.

As shown by operation 1402, the apparatus 200 includes means, such as preprocessing circuitry 210 or the like, for receiving a set of electronic documents. Each electronic document in the set of electronic documents may comprise a set of sentences. In some embodiments, the apparatus 200 may receive the set of electronic documents from a document storage device (e.g., document storage device 110), as described in more detail with reference to FIGS. 1-13. For example, the document storage device may transmit the set of electronic documents to the preprocessing circuitry 210 of apparatus 200. In other embodiments, the apparatus 200 may receive the set of electronic documents by accessing the set of electronic documents stored in the document storage device. In still other embodiments, the apparatus 200 may receive the set of electronic documents from the memory 204 of apparatus 200.

As shown by operation 1404, the apparatus 200 includes means, such as the preprocessing circuitry 210 or the like, for identifying a set of terms for each sentence. Each term in the set of terms may be associated with one or more contexts in a set of contexts (e.g., a hierarchical set of contexts). In some embodiments, the apparatus 200 may identify the set of terms for each sentence as described in more detail with reference to FIGS. 1-13. For example, the apparatus 200 may identify the set of terms for each sentence based on NLP.

As shown by operation 1406, the apparatus 200 includes means, such as the preprocessing circuitry 210 or the like, for generating, based on the set of terms, a context score for each sentence with respect to each context in the set of contexts. In some embodiments, the apparatus 200 may generate the context score as described in more detail with reference to FIGS. 1-13.

As shown by operation 1408, the apparatus 200 includes means, such as the preprocessing circuitry 210 or the like, for generating a contextual index that associates each sentence with one or more of the contexts in the set of contexts based on the context score. In some embodiments, the apparatus 200 may generate the contextual index as described in more detail with reference to FIGS. 1-13. For example, the apparatus 200 may be configured to generate a pathscore for each sentence with respect to each context in the hierarchical set of contexts and then generate the contextual index based on the pathscore. In another example, the apparatus 200 may be configured to generate the contextual index based on supervised text classification.

As shown by operation 1410, the apparatus 200 includes means, such as the query processing circuitry 212 or the like, for receiving an electronic search query provided by a user. The electronic search query may comprise a plurality of search terms. In some embodiments, the apparatus 200 may receive the electronic search query as described in more detail with reference to FIGS. 1-13. For example, the apparatus 200 may receive the electronic search query from a user device (e.g., one or more user devices 112A-112N).

As shown by operation 1412, the apparatus 200 includes means, such as the query processing circuitry 212 or the like, for generating a contextual search ranking for a subset of the set of electronic documents based on the search terms and the contextual index. In some embodiments, the apparatus 200 may generate the contextual search ranking as described in more detail with reference to FIGS. 1-13. For example, the apparatus 200 may be configured to generate contextual field level normalization information based on the set of terms and then generate the contextual search ranking further based on the contextual field level normalization information. In another example, the apparatus 200 may be configured to generate keyword strength information based on the set of sentences and the set of terms and then generate the contextual search ranking further based on the keyword strength information. In another example, the apparatus 200 may be configured to generate context strength information based on the context score and then generate the contextual search ranking further based on the context strength information. In some instances, the apparatus 200 may be configured to generate the context strength information further based on a pathscore for each sentence with respect to each context in a hierarchical set of contexts. In embodiments in which the user directly interacts with the apparatus 200, the query processing circuitry 212 may transmit the generated contextual search ranking by producing a graphic, audio, or multimedia output of the generated contextual search ranking via input-output circuitry 206. In embodiments in which the user does not directly interact with the apparatus 200 (e.g., the apparatus 200 comprises a contextual search ranking system 102, but the user interacts with a document storage device 110 or a user device 112 that is in communication with the contextual search ranking system 102), the query processing circuitry 212 may utilize means, such as communications circuitry 208, for transmitting the generated contextual search ranking. For example, the query processing circuitry 212 may transmit the generated contextual search ranking to a document storage device 110 or a user device 112 for graphic, audio, or multimedia output via input-output circuitry of the document storage device 110 or the user device 112.

In some embodiments, operations 1402, 1404, 1406, 1408, 1410, and 1412 may not necessarily occur in the order depicted in FIG. 14, and in some cases one or more of the operations depicted in FIG. 14 may occur substantially simultaneously, or additional steps may be involved before, after, or between any of the operations shown in FIG. 14.

As noted above, methods, apparatuses, systems, and computer program products are described herein that provide contextual search rankings. By doing so, users are able to avoid the traditional problems surrounding traditional search systems. For instance, through performance of the above operations, a user can avoid receiving search results that are not relevant to the context of the user's electronic search query. Instead, example embodiments described herein provide the most relevant documents searched for by users by contextually indexing a set of electronic documents and generating a contextual search ranking in response to the user's electronic search query. Moreover, in some embodiments, example embodiments described herein provide meaningful search results to users in less time, a more structured format, and reduced cost. Further, in some embodiments, example embodiments described herein decrease preprocessing and storage requirements while providing a better search ranking methodology.

FIG. 14 thus illustrates a flowchart describing the operation of various systems (e.g., contextual search ranking system 102 described with reference to FIG. 1), apparatuses (e.g., apparatus 200 described with reference to FIG. 2), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 14 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the contextual search ranking system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A computing system for searching electronic documents, the computing system comprising at least one non-transitory computer-readable storage medium storing program instructions, when executed by one or more processors, cause the computing system to:
  receive a set of electronic documents, wherein each electronic document in the set of electronic documents comprises a set of sentences;
  identify a set of terms for each sentence in the set of sentences, wherein each term in the set of terms is associated with one or more contexts in a hierarchical set of contexts;
  generate, based at least in part on the set of terms, a context score for each sentence in the set of sentences with respect to each context in the hierarchical set of contexts;
  generate a pathscore for each sentence with respect to each context in the hierarchical set of contexts;
  generate a contextual index that associates each sentence with one or more of the contexts in the hierarchical set of contexts based at least in part on the corresponding context score and the corresponding pathscore;
  receive an electronic search query provided by a user, wherein the electronic search query comprises a plurality of search terms;
  generate a contextual search ranking for a subset of the set of electronic documents based at least in part on the plurality of search terms and the contextual index; and
  provide the contextual search ranking to a user computing system.

2. The computing system of claim 1, wherein the program instructions, when executed by one or more processors, further cause the computing system to identify the set of terms for each sentence based at least in part on natural language processing.

3. The computing system of claim 1, wherein the program instructions, when executed by one or more processors, further cause the computing system to generate the contextual index based at least in part on supervised text classification.

4. The computing system of claim 1, wherein the program instructions, when executed by one or more processors, further cause the computing system to:
  generate contextual field level normalization information based at least in part on the set of terms; and
  generate the contextual search ranking further based at least in part on the contextual field level normalization information.

5. The computing system of claim 1, wherein the program instructions, when executed by one or more processors, further cause the computing system to:

generate keyword strength information based at least in part on the set of sentences and the set of terms; and generate the contextual search ranking further based at least in part on the keyword strength information.

6. The computing system of claim 1, wherein the program instructions, when executed by one or more processors, further cause the computing system to:

generate context strength information based at least in part on the context score; and generate the contextual search ranking further based at least in part on the context strength information.

7. The computing system of claim 6, wherein the set of contexts comprises a hierarchical set of contexts;

wherein the computing system is further configured to generate a pathscore for each sentence with respect to each context in the hierarchical set of contexts; and wherein the program instructions, when executed by one or more processors, further cause the computing system to generate the context strength information further based at least in part on the pathscore.

8. The computing system of claim 1, wherein the program instructions, when executed by one or more processors, further cause the computing system to:

generate relevancy ranking information for each electronic document based at least in part on one or more of contexts; and generate the contextual search ranking further based at least in part on the relevancy ranking information.

9. The computing system of claim 8, wherein the program instructions, when executed by one or more processors, further cause the computing system to:

generate a cumulative ranking score for each electronic document based at least in part on the relevancy ranking information; and generate the contextual search ranking further based at least in part on the cumulative ranking score for each electronic document.

10. The computing system of claim 1, wherein the program instructions, when executed by one or more processors, further cause the computing system to:

generate user interface data based at least in part on the contextual search ranking, wherein the user interface data is configured to be displayed by a display device; and provide the user interface data to the display device.

11. A computer-implemented method for searching electronic documents, the method comprising:

receiving, by one or more processors a set of electronic documents, wherein each electronic document in the set of electronic documents comprises a set of sentences;

identifying, by the one or more processors a set of terms for each sentence in the set of sentences, wherein each term in the set of terms is associated with one or more contexts in a hierarchical set of contexts;

generating, by the one or more processors and based at least in part on the set of terms, a context score for each sentence in the set of sentences with respect to each context in the hierarchical set of contexts;

generating, by the one or more processors, a pathscore for each sentence with respect to each context in the hierarchical set of contexts;

generating, by the one or more processors a contextual index that associates each sentence with one or more of the contexts in the hierarchical set of contexts based at least in part on the corresponding context score and the corresponding pathscore;

receiving, by the one or more processors an electronic search query provided by a user, wherein the electronic search query comprises a plurality of search terms;

generating, by the one or more processors a contextual search ranking for a subset of the set of electronic documents based at least in part on the plurality of search terms and the contextual index; and providing, by the one or more processors, the contextual search ranking to a user computing system.

12. The computer-implemented method of claim 11, further comprising:

generating contextual field level normalization information based at least in part on the set of terms; and generating the contextual search ranking further based at least in part on the contextual field level normalization information.

13. The computer-implemented method of claim 11, further comprising:

generating keyword strength information based at least in part on the set of sentences and the set of terms; and generating the contextual search ranking further based at least in part on the keyword strength information.

14. The computer-implemented method of claim 11, further comprising:

generating context strength information based at least in part on the context score; and generating the contextual search ranking further based at least in part on the context strength information.

15. The computer-implemented method of claim 14, wherein the set of contexts comprises a hierarchical set of contexts, and wherein the computing method further comprises:

generating-context strength information further based at least in part on the pathscore.

16. The c computer-implemented method of claim 11, further comprising:

generating relevancy ranking information for each electronic document based at least in part on one or more of contexts; and generating a cumulative ranking score for each electronic document based at least in part on the relevancy ranking information; and generating the contextual search ranking further based at least in part on the relevancy ranking information and the cumulative ranking score for each electronic document.

17. The computer-implemented method of claim 11, further comprising:

generating user interface data based at least in part on the contextual search ranking, wherein the user interface data is configured to be displayed by a display device; and transmitting the user interface data to the display device.

18. A computer program product for processing electronic information indicative of natural language, the computer program product comprising at least one non-transitory computer-readable storage medium storing program instructions that, when executed, cause a computing system to:

receive a set of electronic documents, wherein each electronic document in the set of electronic documents comprises a set of sentences;

identify a set of terms for each sentence in the set of sentences, wherein each term in the set of terms is associated with one or more contexts in a hierarchical set of contexts;

generate, based at least in part on the set of terms, a context score for each sentence in the set of sentences with respect to each context in the hierarchical set of contexts;

generate a pathscore for each sentence with respect to each context in the hierarchical set of contexts;

generate a contextual index that associates each sentence with one or more of the contexts in the hierarchical set of contexts based at least in part on the corresponding context score and the corresponding pathscore;

generate a contextual search ranking for a subset of the set of electronic documents based at least in part on the plurality of search terms and the contextual index; and provide the contextual search ranking to a user computing system.

* * * * *

UNITED STATES PATENT AND TRADEMARK OFFICE
CERTIFICATE OF CORRECTION

PATENT NO. : 10,885,081 B2  
APPLICATION NO. : 16/025423  
DATED : January 5, 2021  
INVENTOR(S) : Sinha et al.

Page 1 of 1

It is certified that error appears in the above-identified patent and that said Letters Patent is hereby corrected as shown below:

In the Claims

Column 38  
Line 36, In Claim 13, "generating-context" should read --generating context--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*